US012689516B1

(12) United States Patent
Arkoff et al.

(10) Patent No.: US 12,689,516 B1
(45) Date of Patent: Jul. 21, 2026

(54) SYSTEM, METHOD, AND COMPUTER-READABLE MEDIUM FOR ZERO-KNOWLEDGE COMPLIANCE VERIFICATION AND CROSS-JURISDICTIONAL TOKEN-BASED GOVERNANCE

(71) Applicant: OneSource Solutions International, Inc., Sudbury, MA (US)

(72) Inventors: Harold Arkoff, Sudbury, MA (US); Vedran Jukic, Trieste (IT)

(73) Assignee: OneSource Solutions International, Inc., Sudbury, MA (US)

( * ) Notice: Subject to any disclaimer, the term of this patent is extended or adjusted under 35 U.S.C. 154(b) by 0 days.

(21) Appl. No.: 19/397,468

(22) Filed: Nov. 21, 2025

Related U.S. Application Data

(63) Continuation-in-part of application No. 19/278,692, filed on Jul. 23, 2025, now Pat. No. 12,489,633.

(51) Int. Cl.
    *H04L 9/32*         (2006.01)
    *H04L 9/40*         (2022.01)

(52) U.S. Cl.
    CPC ........ *H04L 9/3221* (2013.01); *H04L 63/0807* (2013.01)

(58) Field of Classification Search
    CPC ......................... H04L 9/3221; H04L 63/0807
    USPC ........................................................ 713/168
    See application file for complete search history.

(56) References Cited

U.S. PATENT DOCUMENTS

| | | | |
|---|---|---|---|
| 12,363,156 B1 * | 7/2025 | Thompson ............ | H04L 9/3213 |
| 2023/0237349 A1 * | 7/2023 | Donoho ................. | G06Q 40/02 |
| | | | 706/46 |
| 2024/0179020 A1 * | 5/2024 | Green ....................... | H04L 9/50 |
| 2025/0175456 A1 * | 5/2025 | Crabtree ............... | G06F 16/909 |
| 2025/0190966 A1 * | 6/2025 | Gutierrez-Sheris .... | G06Q 20/20 |

(Continued)

OTHER PUBLICATIONS

Daniele Friolo; Private Electronic Payment with self-Custody and Zero Knowledge verified Reissuance; Jan. 2025; pp. 1-29.*

*Primary Examiner* — Monjur Rahim
(74) *Attorney, Agent, or Firm* — IP Consulting Group; Michael Razavi; Alfred F. Hoyte, Jr.

(57) ABSTRACT

A system, method, and computer-readable medium enforce compliance, policy governance, and jurisdiction-aware control of digital artifacts generated by AI models. A deterministic digest of each artifact is stored in a registry, and a compliance token is generated encoding policy predicates, consent scope, jurisdictional lineage, monetization parameters, and a zero-knowledge proof component including a proof statement ID, cryptographic commitment, and verification key. A gateway verifier receives the artifact and token, verifies the signature, performs zero-knowledge proof validation without revealing regulated data, evaluates encoded policies, and renders a permit-or-deny decision. Verification results and compliance decisions are recorded via a dual-ledger atomic commit engine that updates both compliance and financial ledgers. A settlement engine calculates royalty values based on validated performance metrics and appends the results to the commit entry. Upon jurisdictional transitions, a transition engine detects boundary crossings and issues a forked compliance token with updated predicates. The system ensures verifiable, policy-aware, and jurisdictionally adaptive governance.

20 Claims, 8 Drawing Sheets

COMPLIANCE GOVERNANCE SYSTEM 100

(56)                     References Cited

U.S. PATENT DOCUMENTS

| | | | |
|---|---|---|---|
| 2025/0258928 A1* | 8/2025 | Thompson | G06F 21/577 |
| 2025/0259041 A1* | 8/2025 | Crabtree | G06N 3/047 |
| 2025/0259695 A1* | 8/2025 | Crabtree | G16B 5/00 |
| 2025/0293884 A1* | 9/2025 | Gilchrist | H04L 9/3213 |
| 2025/0358121 A1* | 11/2025 | Mullaney | H04L 9/3213 |

* cited by examiner

COMPLIANCE GOVERNANCE SYSTEM
100

COMPLIANCE GOVERNANCE SYSTEM OVERVIEW

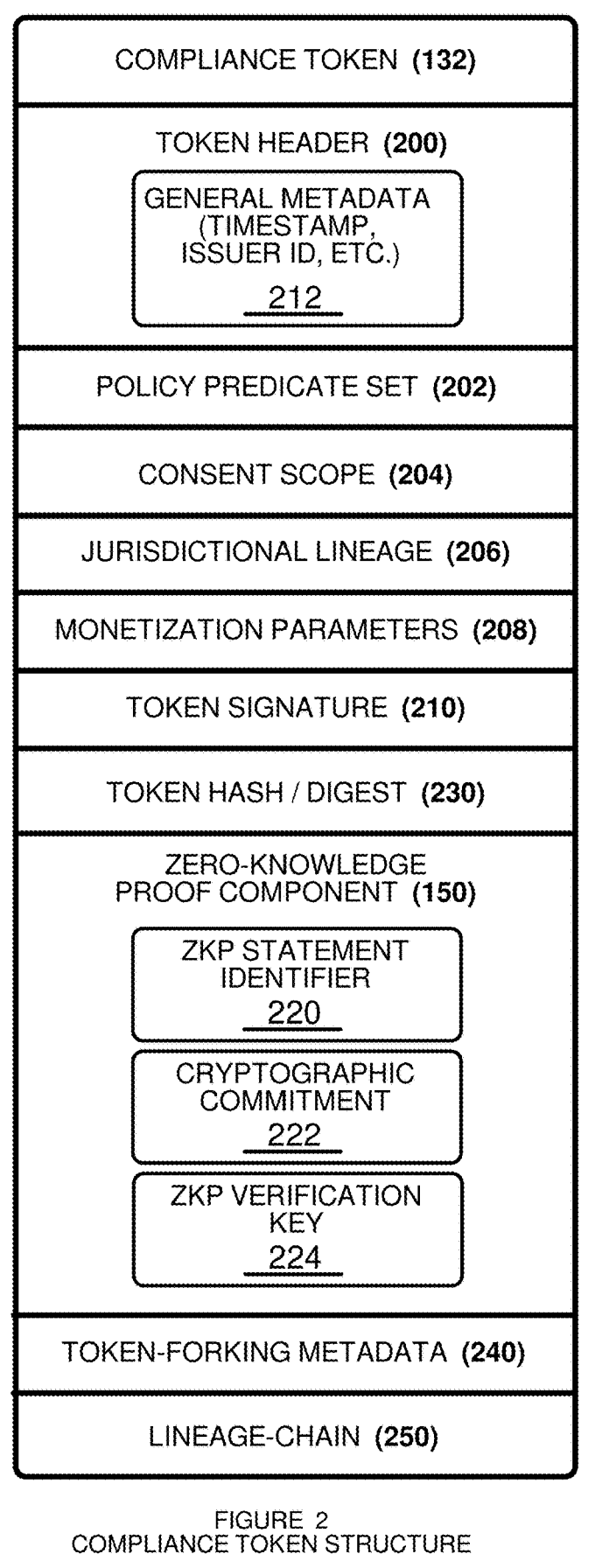

COMPLIANCE TOKEN (132)

TOKEN HEADER (200)

GENERAL METADATA
(TIMESTAMP,
ISSUER ID, ETC.)
212

POLICY PREDICATE SET (202)

CONSENT SCOPE (204)

JURISDICTIONAL LINEAGE (206)

MONETIZATION PARAMETERS (208)

TOKEN SIGNATURE (210)

TOKEN HASH / DIGEST (230)

ZERO-KNOWLEDGE
PROOF COMPONENT (150)

ZKP STATEMENT
IDENTIFIER
220

CRYPTOGRAPHIC
COMMITMENT
222

ZKP VERIFICATION
KEY
224

TOKEN-FORKING METADATA (240)

LINEAGE-CHAIN (250)

FIGURE 2
COMPLIANCE TOKEN STRUCTURE

GATEWAY VERIFIER FINITE-STATE MACHINE

ZERO-KNOWLEDGE PROOF VERIFICATION PROCESS

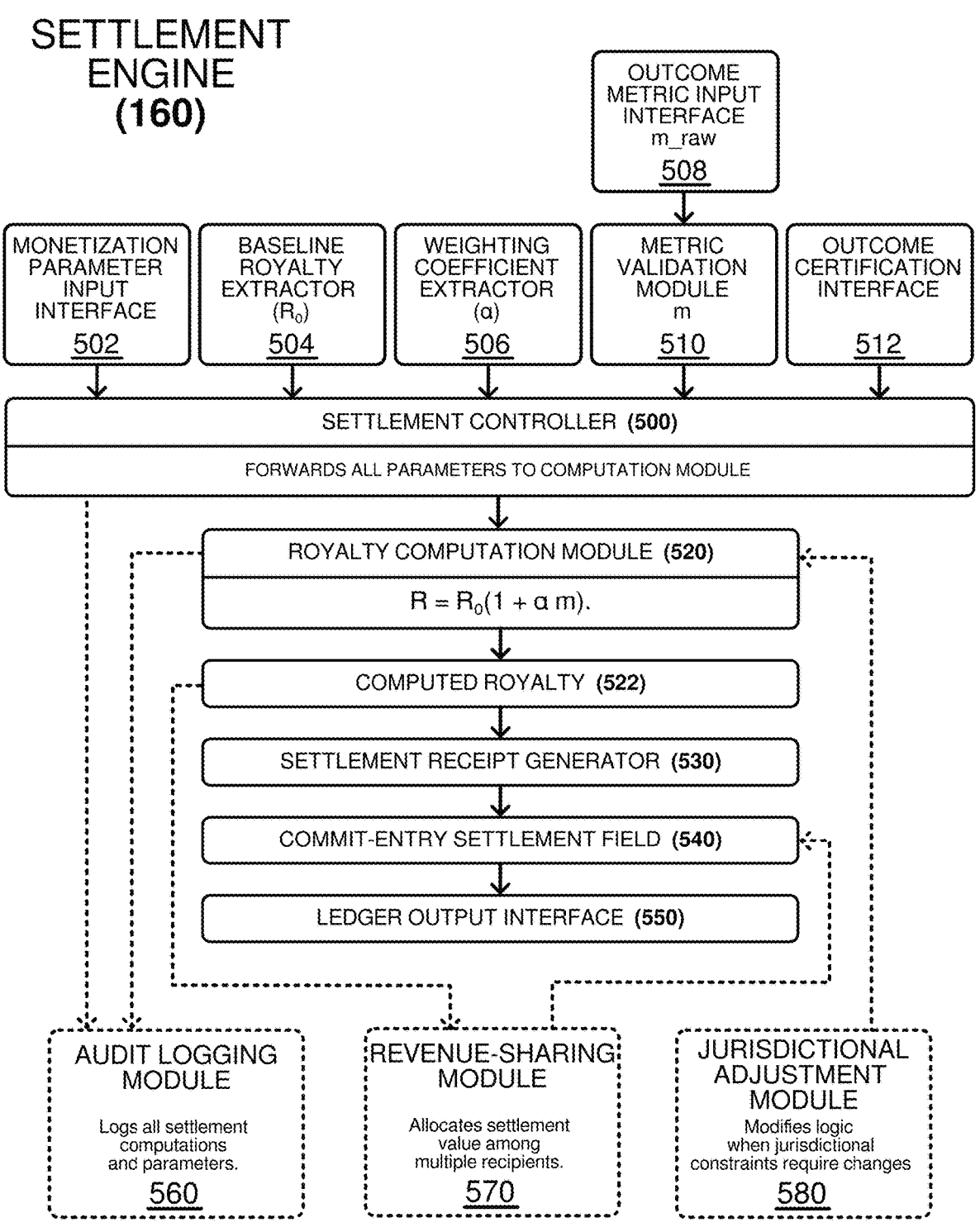

SETTLEMENT
ENGINE
(160)

OUTCOME
METRIC INPUT
INTERFACE
m_raw
508

MONETIZATION
PARAMETER
INPUT
INTERFACE
502

BASELINE
ROYALTY
EXTRACTOR
($R_0$)
504

WEIGHTING
COEFFICIENT
EXTRACTOR
($\alpha$)
506

METRIC
VALIDATION
MODULE
m
510

OUTCOME
CERTIFICATION
INTERFACE
512

SETTLEMENT CONTROLLER (500)

FORWARDS ALL PARAMETERS TO COMPUTATION MODULE

ROYALTY COMPUTATION MODULE (520)

$$R = R_0(1 + \alpha\, m).$$

COMPUTED ROYALTY (522)

SETTLEMENT RECEIPT GENERATOR (530)

COMMIT-ENTRY SETTLEMENT FIELD (540)

LEDGER OUTPUT INTERFACE (550)

AUDIT LOGGING
MODULE

Logs all settlement
computations
and parameters.
560

REVENUE-SHARING
MODULE

Allocates settlement
value among
multiple recipients.
570

JURISDICTIONAL
ADJUSTMENT
MODULE

Modifies logic
when jurisdictional
constraints require changes
580

FIGURE 5
OUTCOME-WEIGHTED SETTLEMENT ENGINE

DUAL-LEDGER ATOMIC COMMIT ENGINE

JURISDICTIONAL BOUNDARY DETECTION AND TOKEN FORKING

COMPLIANCE ENFORCEMENT METHOD FLOWCHART

SYSTEM, METHOD, AND COMPUTER-READABLE MEDIUM FOR ZERO-KNOWLEDGE COMPLIANCE VERIFICATION AND CROSS-JURISDICTIONAL TOKEN-BASED GOVERNANCE

CROSS-REFERENCE TO RELATED APPLICATIONS

This application is a Continuation-in-Part of U.S. application Ser. No. 19/278,692 (filed Jul. 23 2025, entitled "System for Federated Compliance-Token Inheritance, Digital Artifact Registry, and Monetization in Regulated Environments Using Large Language Models"), which is a continuation of U.S. application Ser. No. 18/680,985 (filed May 31 2024, entitled "System and Method for Medical Data Governance Using Large Language Models"), which itself is a continuation of U.S. application Ser. No. 18/417,511 (filed Jan. 19 2024, now U.S. Pat. No. 12,001,464, issued Jun. 4 2024).

FIELD OF INVENTION

The present invention relates generally to computational systems for enforcing compliance, auditability, and governance in the generation, use, and transmission of digital artifacts produced by artificial intelligence models. More particularly, the invention concerns zero-knowledge proof-based verification of policy predicates, token-encoded jurisdictional and consent constraints, outcome-weighted settlement mechanisms, and atomic dual-ledger commit operations implemented across distributed computing environments. The invention further relates to associated methods and computer-readable media for performing these compliance, verification, and governance functions.

BACKGROUND

Artificial intelligence systems are increasingly used to generate digital artifacts such as recommendations, predictions, assessments, and other computational outputs. As these artifacts are shared across institutions, jurisdictions, and computing environments, there is a growing need for mechanisms that can evaluate compliance, enforce policy constraints, and provide auditable verification of regulatory requirements. Existing approaches for managing such artifacts may involve manual review processes, centralized access control, post-hoc auditing, or region-specific implementations that operate differently across environments. These techniques can be difficult to scale, may introduce ambiguity into compliance workflows, and may not provide strong guarantees regarding data minimization or confidentiality.

Challenges arise when digital artifacts must satisfy multiple categories of constraints, including consent requirements, regulatory rules, jurisdiction-specific policies, and contractual limitations. In many settings, compliance checks depend on information that cannot be disclosed directly for privacy, security, or legal reasons. Traditional validation mechanisms may require visibility into underlying data sources, which can be incompatible with privacy-preserving workflows or cross-organizational boundaries. Similarly, systems that operate across jurisdictions often rely on manually configured rules or separate operational pathways, creating potential inconsistencies in how compliance determinations are applied.

Another issue relates to synchronization between compliance verification and financial or operational settlement processes. In various industrial, medical, or commercial contexts, the use of AI-generated artifacts can be associated with cost allocation, reimbursement, or royalty distribution. When compliance and settlement records are stored in different systems or updated at different points in a workflow, discrepancies may occur, making it difficult to verify that settlement calculations correspond to validated compliance outcomes.

Furthermore, distributed computing environments frequently involve geographic and regulatory transitions. When an artifact is transmitted from one jurisdiction to another, the applicable regulatory regime may change, requiring updated rules or policy logic. In many current systems, these updates must be performed manually or by separate infrastructures, which can introduce operational complexity and reduce the transparency of compliance lineage.

There is therefore a need for computational techniques that enable consistent, privacy-preserving, and verifiable enforcement of compliance requirements for digital artifacts generated by artificial intelligence systems, particularly in environments where artifacts traverse multiple jurisdictions or where compliance decisions must be synchronized with financial or operational settlement records. There is also a need for mechanisms that allow verification of compliance predicates without exposing sensitive underlying data, and for architectures that provide deterministic and auditable evaluation of these predicates across heterogeneous computing environments.

OBJECTS OF THE INVENTION

It is an object of the present invention to provide computational mechanisms for validating compliance conditions for digital artifacts generated by artificial intelligence models in a manner that is consistent, deterministic, and suitable for automated deployment across distributed computing environments.

Another object of the invention is to enable verification of policy predicates, consent rules, and jurisdictional constraints using cryptographic techniques such as zero-knowledge proofs, thereby allowing compliance checks to be performed without revealing underlying regulated or confidential data.

A further object of the invention is to provide a unified compliance token that encodes policy, consent, lineage, monetization parameters, and zero-knowledge proof components in a single machine-interpretable structure capable of governing the handling of a corresponding digital artifact.

Another object of the invention is to supply a gateway verification architecture, implemented in part as a finite-state machine, that performs signature verification, zero-knowledge proof validation, policy evaluation, and compliance decision generation in a deterministic and auditable manner.

An additional object of the invention is to offer techniques for computing settlement or royalty values associated with the use of digital artifacts, including the ability to weight such values using validated outcome metrics and to record the results as part of the same commit operations associated with compliance verification.

A further object of the invention is to provide mechanisms for synchronizing compliance decisions and financial or operational settlement results through atomic commit operations across multiple ledger systems, reducing inconsistencies and improving auditability.

Another object of the invention is to deliver automated jurisdictional transition handling, including detecting when a digital artifact crosses regulatory or geographic boundaries and generating updated or forked compliance tokens with jurisdiction-specific predicate sets.

Yet another object of the invention is to maintain comprehensive, machine-verifiable lineage, ancestry, and audit trails for digital artifacts as they move across systems, institutions, or jurisdictions.

These and other objects of the invention will be apparent from the embodiments and examples described herein, and the scope of the invention is defined by the appended claims.

BRIEF SUMMARY OF THE DISCLOSURE

The present invention provides a technical framework for enforcing compliance, provenance, and regulatory governance during the generation, evaluation, and transmission of digital artifacts produced by artificial intelligence models. The invention introduces a machine-interpretable compliance token that encodes policy predicates, consent scope, jurisdictional lineage, monetization parameters, and cryptographic components that enable zero-knowledge validation. Through this structure, the system ensures that compliance decisions can be made deterministically and without exposing underlying regulated or sensitive data.

In one aspect of the invention, a computer-implemented compliance governance system is provided in which each digital artifact is associated with a compliance token containing a zero-knowledge proof component. A gateway verifier implemented as a finite-state machine receives the artifact and its associated token, verifies the token's signature, executes a zero-knowledge validation procedure, evaluates the applicable policy predicates, and records a commit entry reflecting the verification results. The commit entry includes at least an artifact identifier, a zero-knowledge validation outcome, a policy-evaluation result, and a permit-or-deny decision, and is written to a ledger interface that preserves audit integrity.

In a further aspect, the invention supports outcome-weighted settlement computation by enabling a settlement engine to compute royalty or reimbursement values based on validated operational or performance metrics associated with the artifact. The settlement computation is cryptographically bound to the compliance token and recorded as part of the commit entry. The invention thereby links compliance verification to financial or operational settlement in a manner not available in conventional architectures.

In another aspect, the invention introduces a dual-ledger commit mechanism in which compliance verification results and financial settlement information are written as a single atomic transaction across both a compliance ledger and a financial ledger. The compliance token further supports dynamic jurisdictional predicates that modify policy evaluation or settlement allocation when an artifact crosses a jurisdictional boundary. In certain embodiments, the system generates a token fork that incorporates updated jurisdictional predicates, enabling the system to adapt regulatory behavior automatically in cross-border or multi-region deployments.

The invention additionally encompasses computer-implemented methods that perform the steps of generating deterministic digests, constructing compliance tokens, processing the tokens using a finite-state gateway verifier, executing zero-knowledge validation procedures, recording commit entries to ledgers, computing outcome-weighted settlement values, and applying jurisdictional transformations. These methods are implemented in a manner that ensures compliance enforcement is deterministic, scalable, and verifiable without requiring access to sensitive underlying data.

The invention further includes non-transitory computer-readable media storing instructions that cause one or more processors to perform operations corresponding to the system and method embodiments. These media support implementations in cloud computing, distributed systems, or embedded environments in which compliance verification, zero-knowledge processing, and dual-ledger synchronization occur programmatically and without human intervention.

By integrating zero-knowledge proof techniques, tokenized policy representation, jurisdictional propagation, outcome-linked settlement computation, and atomic dual-ledger commit operations into a unified governance architecture, the invention provides technological capabilities that are not present in conventional compliance or provenance systems. The described mechanisms enable verifiable, privacy-preserving, and jurisdictionally aware enforcement of policies governing AI-generated artifacts, thereby addressing longstanding limitations in regulated data processing and distributed governance infrastructures.

System Overview

The compliance governance system disclosed herein provides an integrated architecture for verifying, evaluating, and recording policy-governed handling of digital artifacts generated by artificial intelligence models. The system operates as a deterministic pipeline in which digital artifacts are converted into compliance-verified, jurisdiction-aware, and audit-ready records through coordinated interaction among a set of specialized components. These components include an artifact registry, a structured compliance token, a gateway verifier implemented as a finite-state machine, a settlement engine, and a dual-ledger atomic commit engine. Together, these elements establish a unified computational framework for enforcing policy predicates, validating cryptographic proofs, applying consent and jurisdictional constraints, synchronizing compliance outcomes with operational or financial records, and ensuring that all determinations are traceable and reproducible across distributed computing environments.

The process begins with the generation of a digital artifact by one or more artificial intelligence models. To ensure deterministic handling of the artifact, a cryptographic digest is created and stored within an artifact registry that maintains canonical identifiers associated with each artifact. For every artifact, a corresponding compliance token is generated. This token serves as a machine-interpretable control object that encodes policy predicates, consent scopes, jurisdictional lineage, monetization parameters, and a zero-knowledge proof component. The zero-knowledge proof component includes a proof statement identifier, a cryptographic commitment, and a verification key, enabling the system to validate conditions or assertions related to the artifact without accessing any regulated underlying data.

The compliance token and associated artifact are provided to a gateway verifier implemented as a finite-state machine. The gateway verifier includes at least a token-intake state, a signature-verification state, a policy-evaluation state, and a commit state. In operation, the gateway verifier performs digital signature verification of the token and executes a zero-knowledge proof verification procedure to confirm one or more encoded policy predicates. The use of a finite-state machine ensures deterministic operation, consistent execution paths, and auditability of the validation process. Upon completion of signature and proof verification, the gateway verifier evaluates the policy predicates contained within the token to produce a permit-or-deny decision that governs whether the artifact may be transmitted, stored, or otherwise utilized.

After policy evaluation, the system generates a commit entry that represents the authoritative compliance record for the artifact. The commit entry includes the artifact identifier, the zero-knowledge proof validation outcome, the policy-evaluation result, and the resulting decision. In embodiments where monetization or performance-based settlement is required, a settlement engine computes an adjusted royalty or settlement value based on parameters included within the compliance token and one or more outcome metrics. The settlement engine may append a settlement receipt or related information to the commit entry.

To ensure consistent and tamper-resistant record keeping, the commit entry is written through a dual-ledger atomic commit engine. This engine ensures that the compliance ledger and the financial ledger are updated in an indivisible operation such that compliance determinations, proof validations, and economic settlements remain synchronized. Atomic commit sequencing prevents partial writes or inconsistent states that might otherwise arise in distributed systems.

In environments involving cross-border or multi-jurisdictional processing, the system includes a jurisdictional evaluation mechanism that detects when an artifact transmission traverses regulatory boundaries. When such a transition occurs, the compliance token may be updated or forked to incorporate revised jurisdictional predicates. These updated or forked tokens ensure that data handling, policy evaluation, and settlement computations remain aligned with the rules of the new jurisdiction.

The architecture described herein supports both synchronous and asynchronous operation across heterogeneous infrastructures, including cloud environments, enterprise data centers, and regulated industry systems. Each component functions as part of a unified governance pipeline, providing complete traceability, cryptographic verifiability, and jurisdiction-aware auditability for digital artifacts produced or consumed by artificial intelligence models. The system is designed to be extensible and capable of supporting diverse compliance domains, including medical devices, financial analysis, industrial optimization, and other regulated or high-consequence applications.

BRIEF DESCRIPTION OF THE DRAWINGS

FIG. 2 illustrates an example structure of a compliance token that encodes a policy predicate set, a consent scope, a jurisdictional lineage, monetization parameters, and a zero-knowledge proof component comprising a proof statement identifier, a cryptographic commitment, and a verification key.

FIG. 5 illustrates an example configuration of a settlement engine for computing an outcome-weighted royalty value based on parameters encoded in the compliance token and validated performance metrics.

DETAILED DESCRIPTION OF THE DISCLOSURE

Detailed Description of the Figures

Figure 1:
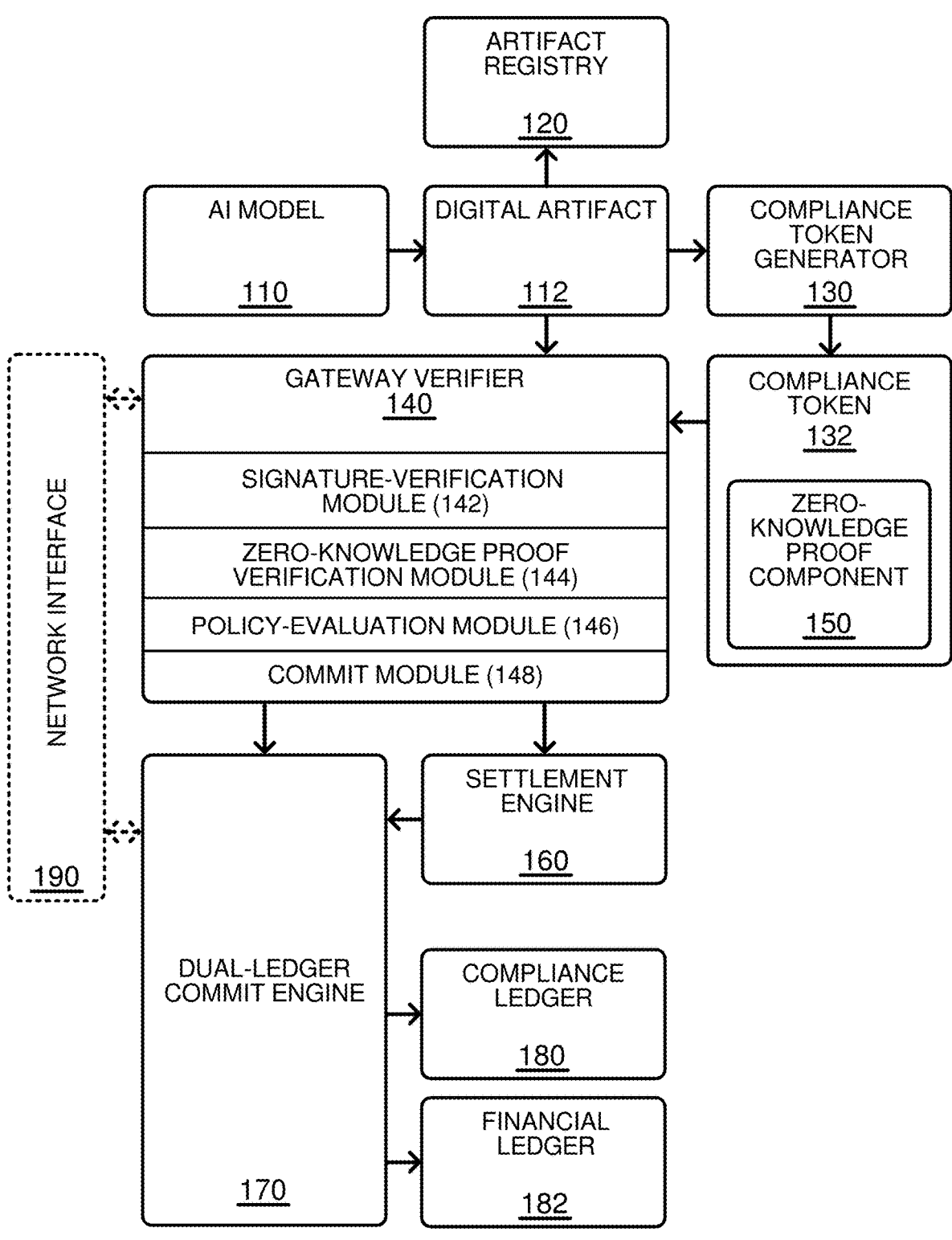
FIG. 1 illustrates an example architecture of a compliance governance system for verifying and recording compliance of digital artifacts generated by artificial intelligence models. The architecture includes an artifact registry, a compliance token generator, a gateway verifier, a zero-knowledge proof verification module, a settlement engine, and a dual-ledger commit engine.

FIG. 1 illustrates an example architecture of a computer-implemented compliance governance system 100 configured to enforce policy, consent, jurisdictional, and settlement constraints for digital artifacts produced by artificial intelligence models. In the illustrated embodiment, an AI model 110 generates a digital artifact 112, such as a text output, image, clinical inference, structured report, or other machine-produced data object. The digital artifact 112 is provided to an artifact registry 120, which generates and stores a deterministic digest corresponding to the artifact. The deterministic digest permits subsequent identification of the artifact during verification and audit operations.

A compliance token generator 130 constructs a compliance token 132 associated with the digital artifact 112. The compliance token 132 encodes various compliance-relevant parameters, including a policy predicate set, a consent scope, a jurisdictional lineage, monetization parameters, and a zero-knowledge proof component 150 that enables cryptographic validation of compliance conditions without revealing regulated underlying data. The compliance token 132 is communicated, together with the corresponding digital artifact 112, to a gateway verifier 140.

In the illustrated embodiment, the gateway verifier 140 is implemented as a finite-state machine comprising a sequence of verification and evaluation modules. The gateway verifier 140 includes a signature-verification module 142 configured to authenticate the compliance token 132, a zero-knowledge proof verification module 144 configured to validate the ZKP component 150, and a policy-evaluation module 146 that interprets the policy predicates contained in the token. Upon completion of these operations, a commit module 148 generates a commit entry that includes the artifact identifier, the outcome of zero-knowledge proof verification, the policy-evaluation result, and a permit-or-deny decision.

In certain embodiments, the system further includes a settlement engine 160 that computes royalty values or outcome-weighted reimbursement amounts based on monetization parameters included in the compliance token 132 and validated outcome metrics associated with the artifact 112. The settlement computation may be appended to the commit entry generated by the commit module 148.

A dual-ledger commit engine 170 communicates commit entries to a compliance ledger 180 and a financial ledger 182, and in some embodiments ensures that both ledgers update atomically in response to the verification outcome. The illustrated system may also include a network interface 190 for receiving artifacts, transmitting results, or enforcing jurisdictional constraints during cross-border or multi-region deployments.

The architecture depicted in FIG. 1 illustrates one example configuration of the compliance governance system 100, and other configurations may be used to implement the functions described herein.

FIG. 2 illustrates an example structure of a compliance token 132 used to represent policy, consent, jurisdictional, monetization, and cryptographic verification information for a digital artifact generated by an artificial intelligence model. In the illustrated embodiment, the compliance token 132 includes a token header 200 that identifies the token format and version, and may include general metadata 212, such as a timestamp, a token issuer identifier, and optional sequence information.

The compliance token 132 further includes a policy predicate set 202, which encodes one or more machine-interpretable rules that govern the permitted use, transformation, evaluation, or transmission of the associated digital artifact. A consent scope 204 specifies the consent conditions applicable to the artifact, including whether the artifact relates to a specific individual, the permitted purposes of use, and any associated privacy or confidentiality restrictions. A jurisdictional lineage field 206 encodes information about the regulatory regions or legal domains that apply to the artifact and provides a basis for determining whether additional policy transformations or jurisdiction-specific constraints must be enforced.

A monetization parameter field 208 defines financial or operational parameters associated with the artifact, such as baseline royalty values, weighting coefficients for outcome-based adjustments, or settlement conditions derived from validated performance metrics. In some embodiments, a token signature field 210 is included to authenticate and bind the token to its issuer, and a token hash or deterministic digest 230 uniquely identifies the token in the artifact registry or ledger interfaces.

The compliance token 132 additionally includes a zero-knowledge proof component 150 comprising multiple subfields. A ZKP statement identifier 220 identifies the specific predicate or computational claim that the proof relates to. A cryptographic commitment 222 binds the underlying regulated or sensitive data to the proof without revealing such data externally. A ZKP verification key 224 is provided to permit efficient verification of the proof by a verifier, such as the gateway verifier shown in FIG. 1. These components collectively allow the system to confirm compliance with policy predicates, consent constraints, or jurisdictional rules while preserving the confidentiality of regulated data.

In some embodiments, the zero-knowledge proof component validates export-control predicates that govern whether a digital artifact may be transmitted, accessed, or processed in specific geopolitical regions or under specific regulatory regimes. The export-control ZKP may confirm compliance with encryption-control regulations, restricted-party lists, or cross-border computational constraints without disclosing the underlying sensitive attributes that triggered the validation requirement.

The verification algorithm may additionally ensure that regulated model outputs, such as clinical inferences or sensitive embeddings, are not exported to restricted destinations unless the jurisdictional lineage and export-control predicates encoded in the token are satisfied, thereby supporting automated compliance with international data transfer laws.

In certain embodiments, the compliance token 132 may further include optional fields such as token-forking metadata 240, which is used when a digital artifact crosses a jurisdictional boundary and requires generation of a derived token for a different regulatory domain, and a lineage-chain record 250, which tracks the ancestry of the token across model updates, retraining events, or jurisdictional transformations.

The token structure illustrated in FIG. 2 is one example configuration, and other arrangements of fields, metadata, and cryptographic components may be employed while remaining consistent with the functions described throughout this disclosure.

Figure 3:
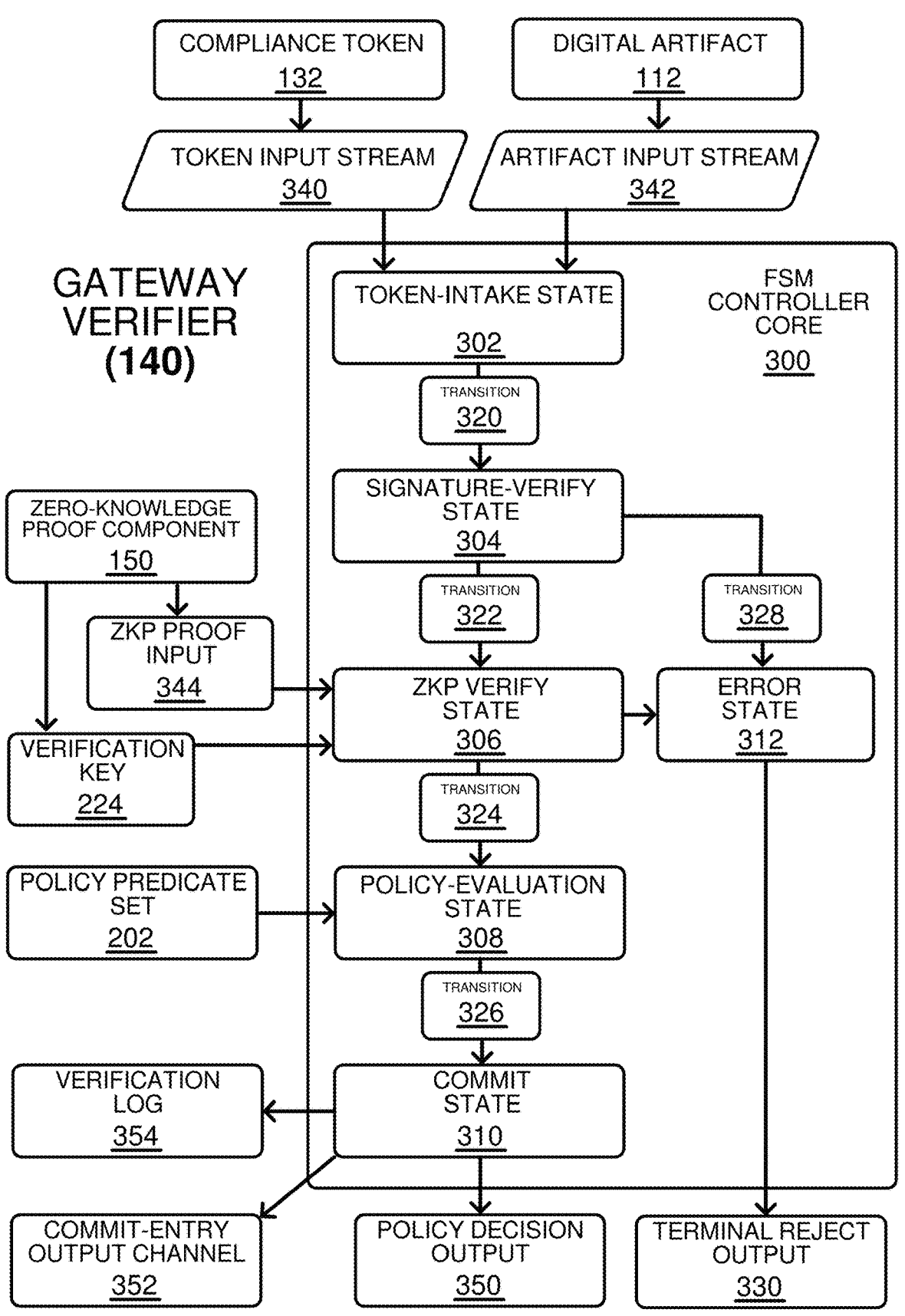
FIG. 3 illustrates an example finite-state machine implementation of a gateway verifier including states for token intake, signature verification, zero-knowledge proof verification, policy evaluation, and commit processing.

FIG. 3 illustrates an example implementation of the gateway verifier 140 as a finite-state machine configured to perform deterministic, machine-executable compliance verification for digital artifacts associated with cryptographically encoded compliance tokens. The gateway verifier includes an FSM controller core 300 that coordinates state transitions and ensures that the compliance-verification sequence proceeds in a fixed, reproducible order across distributed environments.

Upon receiving a compliance token and a corresponding digital artifact via the token input stream 340 and artifact input stream 342, the FSM enters a token-intake state 302. In this state, the gateway verifier parses the compliance token 132, validates basic formatting requirements, and extracts token fields required for subsequent verification, including any zero-knowledge proof component 150.

After successful intake, the FSM transitions to a signature-verification state 304 via transition 320. In the signature-verification state 304, the gateway verifier authenticates the compliance token by verifying its associated digital signature against a trusted issuer key. If signature verification fails, the FSM transitions to the error-handling state 312 through transition 328, ultimately producing a terminal reject output 330. If signature verification succeeds, the FSM proceeds to the zero-knowledge proof verification state 306 via transition 322.

In the zero-knowledge proof verification state 306, the gateway verifier applies a zero-knowledge proof verification procedure using the ZKP proof input 344 and associated verification key 224. The verification process confirms that one or more policy predicates, consent constraints, or jurisdictional conditions encoded in the token have been satisfied without requiring access to regulated underlying data. If the ZKP proof fails validation, the FSM transitions to the error-handling state 312; if the proof succeeds, the FSM transitions to the policy-evaluation state 308 via transition 324.

The policy-evaluation state 308 interprets and executes the policy predicate set 202 contained in the compliance token 132, evaluating the conditions under which the artifact 112 may be used, transmitted, or stored. The result of this evaluation determines whether the system will generate a permit or deny decision. After policy evaluation is completed, the FSM transitions to the commit state 310 via transition 326.

Figure 6:
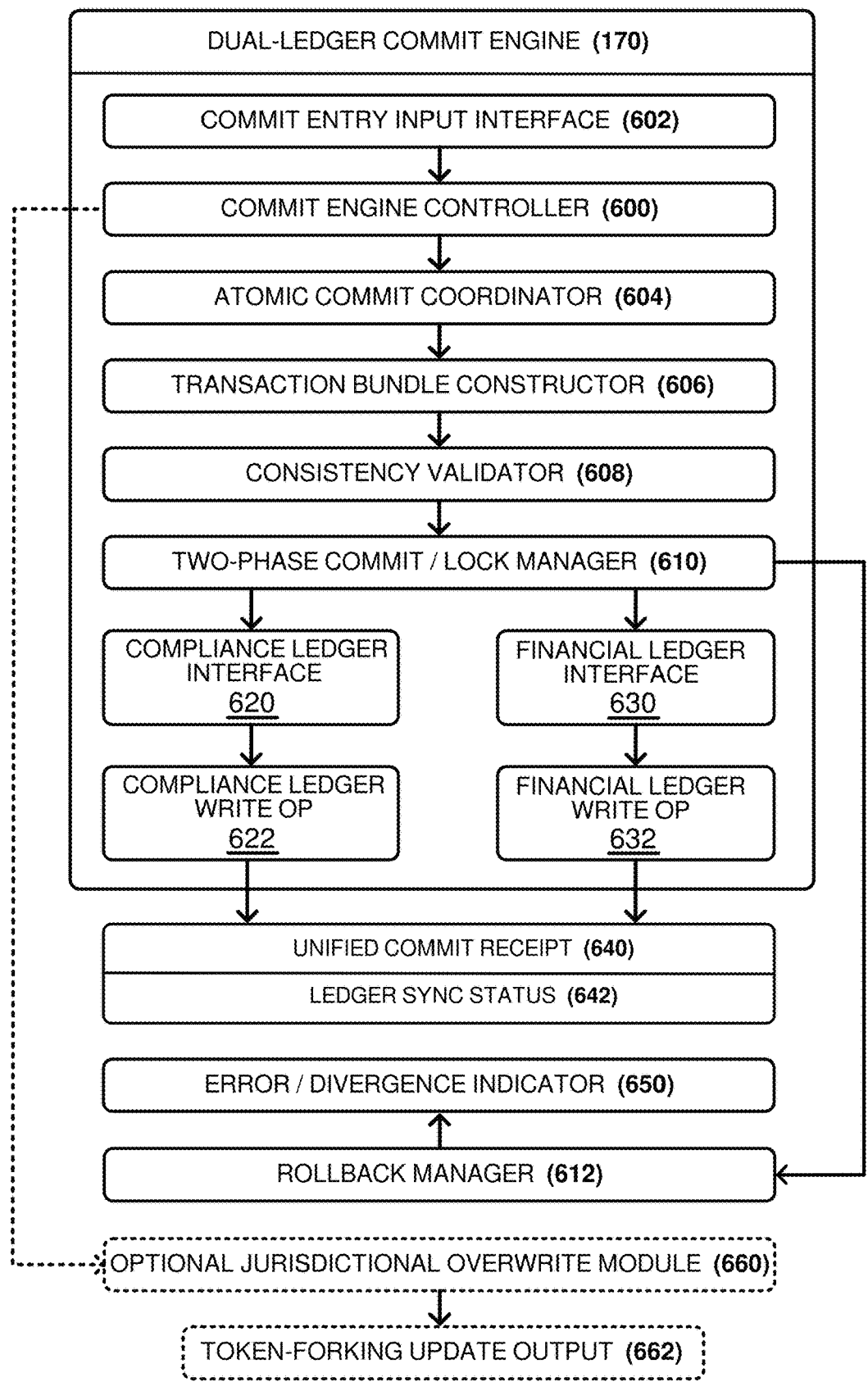
FIG. 6 illustrates an example dual-ledger commit mechanism in which a compliance decision and associated settlement information are recorded as a single atomic transaction across a compliance ledger and a financial ledger.

In the commit state 310, the gateway verifier prepares and outputs a commit entry that includes the artifact identifier, the result of zero-knowledge proof verification, the outcome of policy evaluation, and the final permit-or-deny decision. These results are output through the commit-entry output channel 352 and may be forwarded to a dual-ledger commit engine 170 as illustrated in FIG. 6. A policy decision output 350 is also generated for external enforcement, and a verification log 354 may be generated for audit purposes.

The FSM structure illustrated in FIG. 3 provides a deterministic, machine-enforceable compliance mechanism that verifies signature authenticity, evaluates zero-knowledge proofs, interprets policy constraints, and records results in a prescribed sequence. This structure ensures that compliance verification occurs consistently and transparently across distributed and jurisdictionally diverse computing environments.

Figure 4:
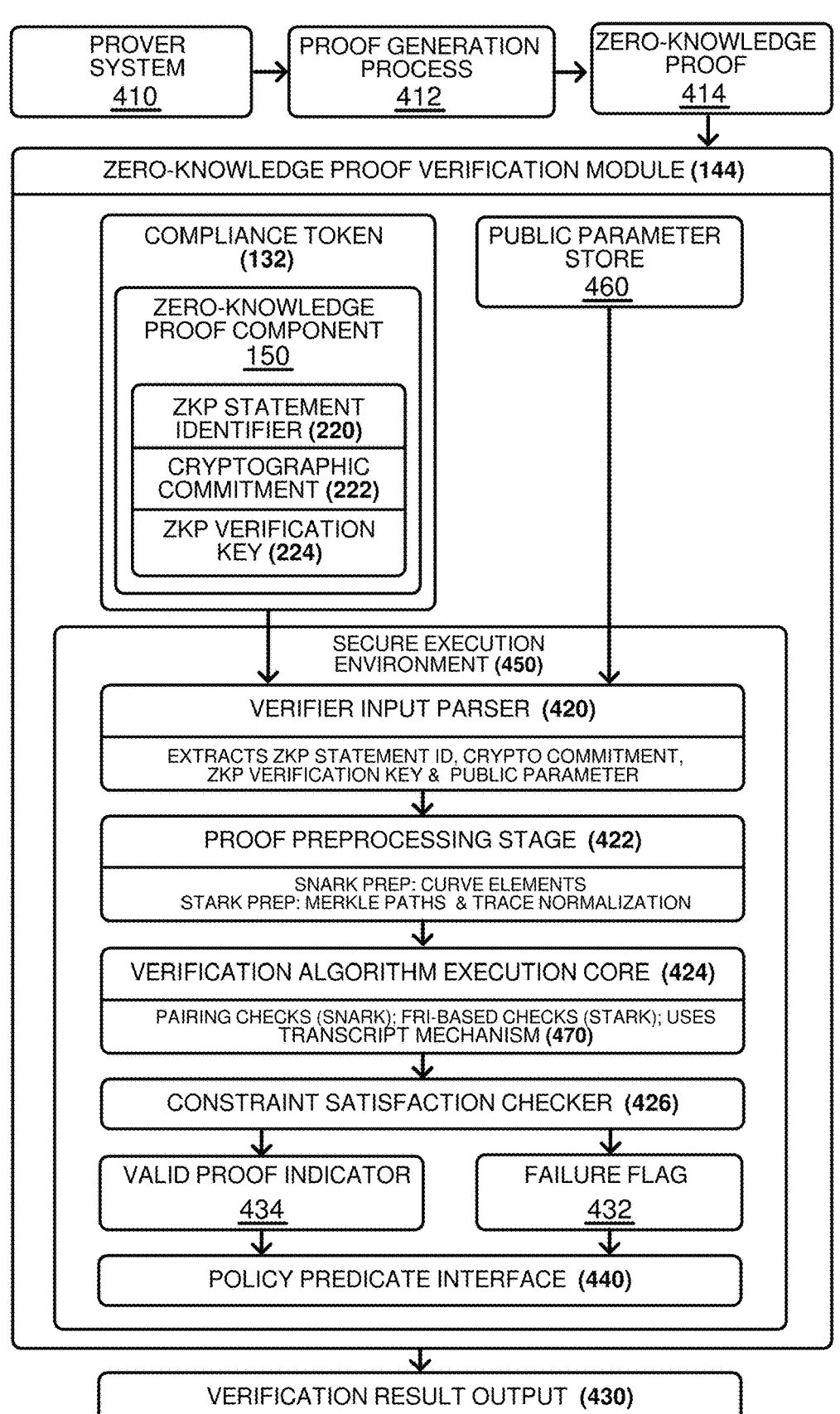
FIG. 4 illustrates an example process for verifying a zero-knowledge proof associated with a compliance token and providing the resulting validation output to a policy-evaluation module.

FIG. 4 illustrates an example process for verifying a zero-knowledge proof associated with a compliance token 132, as performed by the zero-knowledge proof verification module 144 within the compliance governance system. The process ensures that policy predicates or regulatory conditions encoded in the compliance token may be validated without exposing underlying sensitive or regulated data.

In the illustrated embodiment, a prover system 410 generates a zero-knowledge proof through a proof generation process 412 using the ZKP component 150 contained in the compliance token 132. The ZKP component includes a statement identifier 220, which specifies the policy predicate to be proven, a cryptographic commitment 222, which binds the underlying data or computation to the proof, and a ZKP verification key 224, which enables efficient verification by a verifier. The output of the proof generation process is a zero-knowledge proof 414, which is transmitted to the verifier.

Upon receiving the proof 414, the ZKP verification module 144 employs a verifier input parser 420 that extracts the relevant parameters from the compliance token 132, the ZKP verification key 224, the cryptographic commitment 222, and any public parameters stored in a public parameter store 460. The parsed information is forwarded to a proof preprocessing stage 422, which formats or normalizes the proof input depending on the underlying proof system. For example, in zk-SNARK embodiments, preprocessing may involve preparing elliptic-curve elements or evaluating fixed-parameter polynomials, while in zk-STARK embodiments preprocessing may involve preparing the execution trace, Merkle authentication paths, or hash-based transcripts.

After preprocessing, the verification algorithm execution core 424 applies the corresponding verification algorithm defined by the underlying ZKP construction. In zk-SNARK implementations, this step may include pairing-based operations or polynomial identity checks, while in zk-STARK implementations this step may include FRI-based proof evaluations executed within a transparent hash-based transcript mechanism 470. The verification algorithm execution core communicates with a constraint satisfaction checker 426 that confirms whether the committed computation or predicate satisfies the encoded regulatory or policy constraints.

If the proof is valid, the ZKP verification module produces a valid proof indicator 434, which is communicated to the finite-state policy-evaluation stage via a policy predicate interface 440. If the proof is invalid or malformed, the module generates a failure flag 432, which may trigger an error-handling state in the gateway verifier FSM as illustrated in FIG. 3. Regardless of the outcome, the verification module also produces a verification result output 430, which may be recorded as part of the commit entry generated by the compliance governance system.

In certain embodiments, the ZKP verification process is executed within a secure execution environment 450, such as a hardware-backed trusted execution environment (TEE), to provide additional protection of sensitive public parameters or internal verification state. The architecture depicted in FIG. 4 supports both zk-SNARK and zk-STARK embodiments and allows compliance predicates, consent rules, dataset lineage constraints, or jurisdictional requirements to be validated without exposing any underlying regulated data.

In Software-as-a-Medical-Device (SaMD) deployments, dataset-lineage predicates may be defined within a predetermined change control plan, such as one governing model updates, input-dataset versioning, retraining events, or post-market performance monitoring. In such embodiments, the zero-knowledge proof component of the compliance token may encode a predicate asserting that a digital artifact was produced using an approved dataset version or model configuration specified by the change control plan. The ZKP verification module can validate compliance with this predetermined change control plan without revealing any underlying patient data, training data, or proprietary model details.

FIG. 5 illustrates an example configuration of a settlement engine 160 that computes an outcome-weighted royalty or reimbursement value based on monetization parameters encoded in a compliance token and on validated outcome metrics associated with a digital artifact. The settlement engine operates as part of the compliance governance system and ensures that settlement values are computed only after the gateway verifier has successfully validated any applicable zero-knowledge proofs or policy predicates.

The settlement engine includes a settlement controller 500 that orchestrates the retrieval and processing of settlement-relevant information. Monetization parameters are received through an input interface 502, and the baseline royalty value is extracted by a baseline royalty extractor 504, which reads the parameter $R_0$ from the monetization field 208 of the compliance token. A weighting coefficient extractor 506 retrieves the coefficient $\alpha$, which determines the sensitivity of the royalty adjustment to validated performance metrics.

An outcome metric input interface m_raw 508 receives the outcome metric m, which may include metrics such as diagnostic accuracy improvements, reductions in hospital readmission rates, reductions in false-positive fraud alerts, or improvements in emissions or energy efficiency. Before the metric is used in any computation, it is processed by a metric validation module m 510, which confirms that the metric has been authenticated, is derived from permitted sources, and has not been altered or tampered with during transmission.

In embodiments in which the outcome metric is validated through a zero-knowledge proof, a dedicated outcome certification interface 512 receives the validation status from the zero-knowledge verification module described in FIG. 4. This ensures that the settlement engine can accept metrics whose correctness has been established without revealing any underlying confidential or regulated data. Only metrics that have passed such validation may be incorporated into the settlement computation.

The royalty computation module 520 performs the calculation of the adjusted royalty value using the formula:

$$R = R_0(1 + \alpha m),$$

where $R_0$, $\alpha$, and m are provided by the modules described above. The resulting adjusted royalty value is stored as computed royalty 522, which represents the final settlement amount attributable to the digital artifact.

Once computed, the adjusted royalty value is forwarded to a settlement receipt generator 530, which produces a structured settlement record suitable for incorporation into the system's commit entry. The settlement record, shown abstractly as the commit-entry settlement field 540, is then transmitted to a ledger output interface 550, which communicates the settlement information to the dual-ledger commit engine described in FIG. 6.

In some embodiments, the settlement engine includes an audit logging module 560 that records all settlement computations, parameter values, and validation states for audit and regulatory review. Additional embodiments may include a revenue-sharing allocation module 570, which divides the settlement value among multiple stakeholders or model contributors, and a jurisdictional adjustment module 580, which modifies settlement logic when jurisdictional restrictions encoded in the compliance token require different allocation or computation rules.

The architecture illustrated in FIG. 5 demonstrates how the settlement engine binds financial or operational settlement to cryptographically validated compliance conditions and outcome-based metrics, enabling deterministic and transparent settlement behavior in regulated environments.

FIG. 6 illustrates an example dual-ledger atomic commit mechanism performed by a dual-ledger commit engine 170, which ensures that compliance-verification results and settlement values are recorded as a single, indivisible transaction across both a compliance ledger 180 and a financial ledger 182. The architecture enables deterministic synchronization of regulatory and financial records, thereby preventing partial or inconsistent updates in distributed or cross-jurisdictional environments.

The commit engine includes a commit engine controller 600 that receives commit entries through a commit entry input interface 602. Each commit entry may contain an artifact identifier, the result of zero-knowledge proof verification, the policy-evaluation outcome, a permit-or-deny decision, and an adjusted royalty value when applicable. Once received, the commit entry is forwarded to an atomic commit coordinator 604, which manages the overall commit process across both ledgers.

A transaction bundle constructor 606 groups the compliance and financial updates derived from the commit entry into a single atomic bundle. This bundle ensures that the compliance ledger 180 and the financial ledger 182 reflect the same underlying compliance and settlement decision. Before committing, a consistency validator 608 verifies that all required fields are present and that no jurisdictional contradictions or invalid constraints exist within the commit entry.

To enforce atomicity across distributed ledger systems, the commit engine may employ a lock manager or two-phase commit manager 610, which acquires write locks or commit reservations on both the compliance ledger through a compliance ledger interface 620 and the financial ledger through a financial ledger interface 630. Once the locks are secured, the transaction bundle is committed via a compliance ledger write operation 622 and a corresponding financial ledger write operation 632.

If the write operations complete successfully on both ledgers, the commit engine generates a unified commit receipt 640, which serves as a cryptographic confirmation that the transaction was successfully recorded across both systems. A ledger synchronization status indicator 642 is updated to reflect the success of the operation. If any inconsistency or write failure occurs during the commit sequence, a rollback manager 612 reverses any partial modifications, and an error or divergence indicator 650 is produced to signal the failure.

In some embodiments, the commit engine includes a jurisdictional overwrite module 660, which modifies ledger-specific fields when the compliance token indicates that the commit crosses a jurisdictional boundary. Updated jurisdictional constraints or compliance parameters may then be exported through a token-forking update output 662, which interfaces with the jurisdictional propagation mechanisms illustrated in FIG. 7.

The architecture shown in FIG. 6 provides deterministic, tamper-resistant synchronization between regulatory compliance records and financial settlement records. The dual-ledger atomic commit mechanism prevents discrepancies that could otherwise occur in distributed environments, and forms a core component of the compliance governance system described throughout this disclosure.

Figure 7:
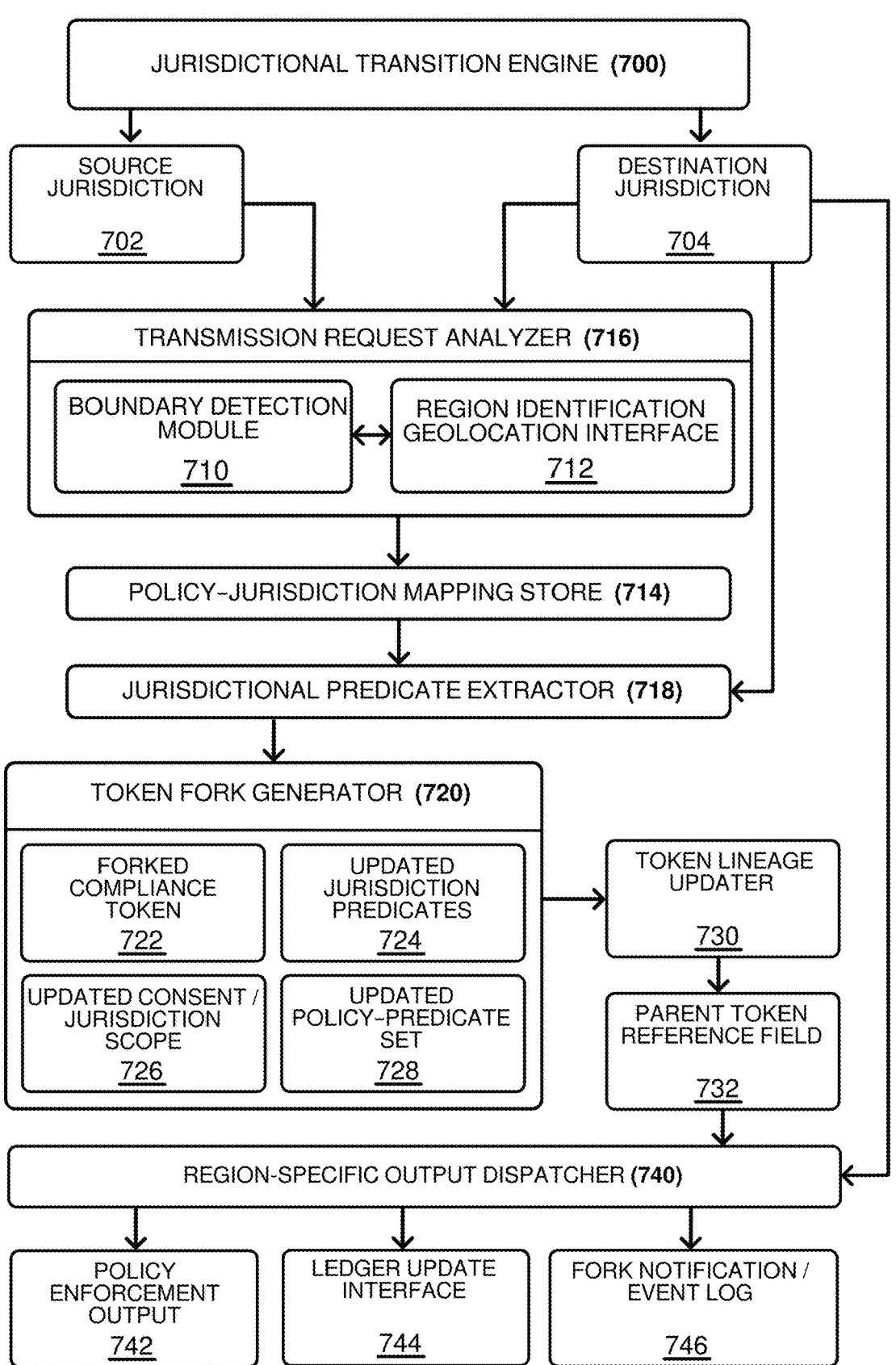
FIG. 7 illustrates an example mechanism for applying jurisdictional predicate sets to a digital artifact when the artifact crosses a jurisdictional boundary, including generation of a token fork containing updated jurisdictional predicates.

FIG. 7 illustrates an example mechanism for detecting a jurisdictional boundary crossing and generating a token fork containing updated jurisdictional predicates. This mechanism enables the compliance governance system to adapt regulatory behavior when a digital artifact is transmitted from one region to another, thereby ensuring that the artifact remains compliant with local laws, consent rules, and policy constraints.

In the illustrated embodiment, the system includes a jurisdictional transition engine 700 that receives a transmission request for a digital artifact associated with an existing compliance token 132. The request is analyzed by a transmission request analyzer 716, which inspects routing metadata, destination identifiers, user attributes, and environmental parameters to determine whether the artifact is intended to cross from a source jurisdiction 702 to a destination jurisdiction 704.

A boundary detection module 710, operating in conjunction with a geolocation or region identification interface 712, determines whether the request involves a transition between legally or regulatorily distinct regions. The system may reference a policy-jurisdiction mapping store 714, which maintains a structured representation of the regulatory conditions, data-protection rules, and policy constraints applicable to each jurisdiction. Once a boundary crossing is detected, a jurisdictional predicate extractor 718 retrieves the applicable jurisdictional predicates associated with the destination region 704.

In response to detecting a jurisdictional transition, a token fork generator 720 creates a forked compliance token 722. The forked token incorporates updated jurisdictional predicates 724, which reflect the laws or regulatory regimes applicable to the destination jurisdiction. The forked token may also include an updated consent or jurisdiction scope record 726, in cases where the permitted uses of an artifact differ between regions. Similarly, the forked token may include an updated policy predicate set 728, which may impose additional constraints, reporting rules, or processing limitations imposed by the new jurisdiction.

In some embodiments, the combination of updated jurisdictional predicates 724 and updated policy predicate set 728 together forms the jurisdictional predicate set referenced in the claims.

To maintain lineage and traceability across token transformations, the token fork generator 720 updates the token's ancestry record using a token lineage updater 730, which introduces or modifies a parent token reference field 732 indicating the identifier of the original token. In some embodiments, the token-forking metadata 240 preserved within the original token 132 is incorporated into the forked token 722, providing transparency regarding the reason for the transformation and the applicable jurisdictional context.

After generating the forked token 722, the system dispatches the forked token to the destination environment using a region-specific output dispatcher 740, which ensures that the artifact and its compliance metadata are handled in accordance with the applicable rules of the destination jurisdiction 704. The updated jurisdictional and policy predicates may be forwarded to the system's policy-enforcement components, represented abstractly as a policy enforcement output 742. In some embodiments, jurisdictional transitions may trigger ledger-recording events through a ledger update interface 744, integrating with the dual-ledger atomic commit mechanism described in FIG. 6. Additionally, a fork notification or event log 746 may be generated to preserve a transparent audit trail of the jurisdictional transformation.

The architecture shown in FIG. 7 enables the compliance governance system to adapt artifact governance dynamically as artifacts move across regulatory or legal domains. By generating a forked compliance token that incorporates updated jurisdictional and policy predicates, the system ensures that the compliance requirements of the destination region are enforced automatically and without exposing sensitive underlying data.

Figure 8:
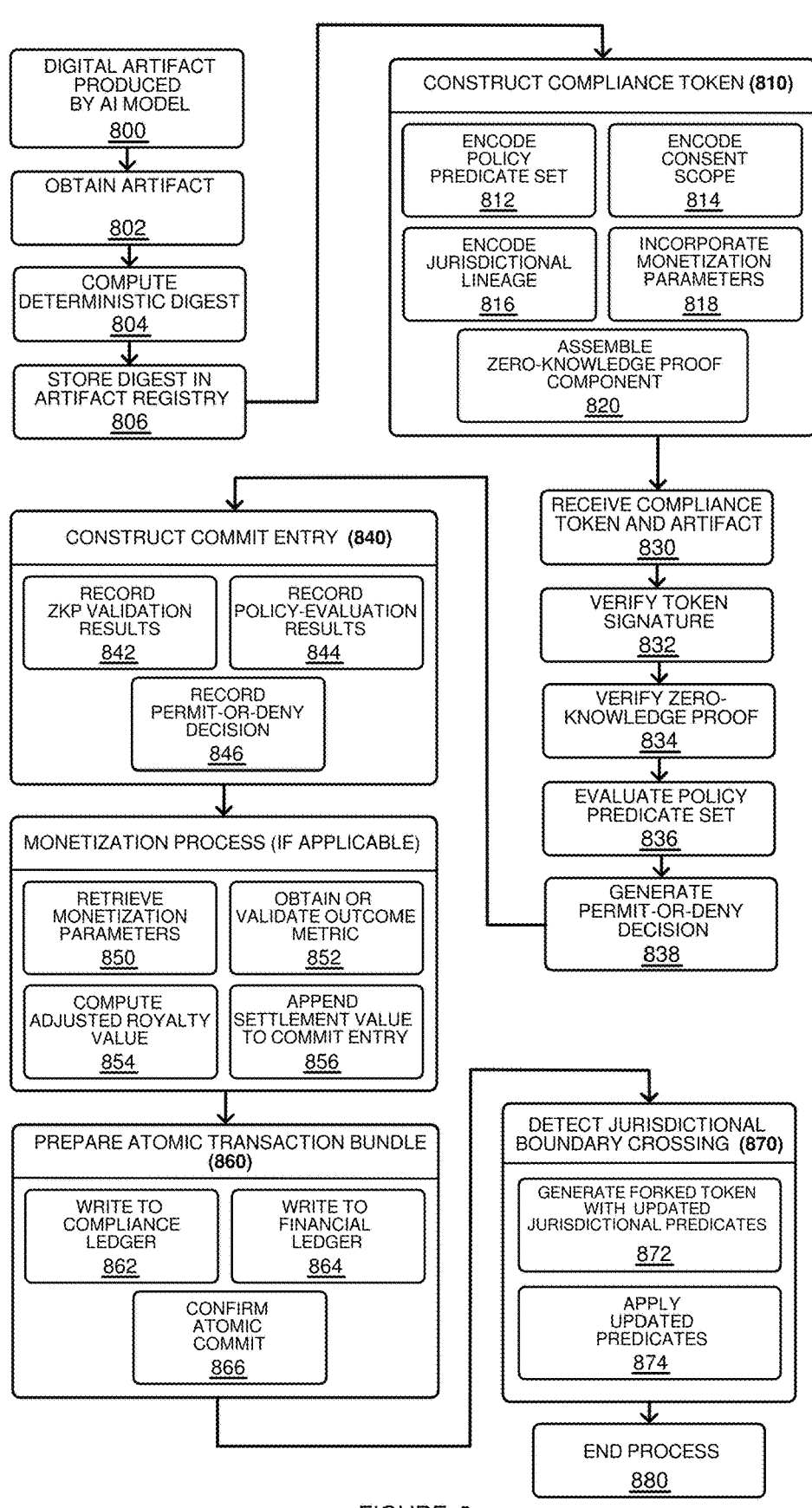
FIG. 8 illustrates an example method for enforcing compliance of digital artifacts generated by artificial intelligence models, including digest generation, token construction, gateway verification, zero-knowledge proof validation, policy evaluation, and ledger commit operations.

FIG. 8 illustrates an example method for enforcing compliance of digital artifacts generated by artificial intelligence models. The method begins at step 800, where a digital artifact is produced by an AI model. In step 802, the artifact is obtained by the system, and in step 804, a deterministic digest of the artifact is computed. The digest is stored in an artifact registry during step 806, providing a persistent identifier that allows the artifact to be referenced reliably during subsequent verification and audit operations.

In step 810, the system constructs a compliance token associated with the digital artifact. The token includes a policy predicate set encoded at step 812, a consent scope encoded at step 814, and a jurisdictional lineage encoded at step 816. Monetization parameters are incorporated at step 818, enabling the system to compute settlement values based on validated outcome metrics. In step 820, the system assembles a zero-knowledge proof component that includes a statement identifier, a cryptographic commitment, and a verification key corresponding to the predicate to be proven.

The compliance token and artifact are received by a gateway verifier in step 830, where the system performs a series of verification operations. In step 832, the system verifies the digital signature of the compliance token. In step 834, a zero-knowledge proof verification procedure is executed to validate applicable policy predicates without exposing underlying sensitive or regulated data. In step 836, the policy predicate set is evaluated, and in step 838, the system generates a permit-or-deny decision governing the permitted use or transmission of the digital artifact.

A commit entry is constructed at step 840, which records the ZKP validation results in step 842, the policy-evaluation results in step 844, and the permit-or-deny decision in step 846. If monetization parameters are present, the system retrieves these parameters at step 850 and obtains or validates an associated outcome metric during step 852. Using this information, an adjusted royalty value is computed in step 854, and the settlement value is appended to the commit entry in step 856.

The method then prepares an atomic transaction bundle in step 860, which is written to a compliance ledger in step 862 and to a financial ledger in step 864. The system confirms the atomic commit in step 866, ensuring that both ledgers remain synchronized and that the compliance and financial results reflect the same underlying verification decision.

In some embodiments, the method further includes jurisdictional processing. In step 870, the system detects whether a requested transmission of the digital artifact crosses a jurisdictional boundary. If so, the system generates a forked compliance token containing updated jurisdictional predicates at step 872. These updated predicates are applied during subsequent policy evaluation or settlement computation at step 874, ensuring that the artifact remains compliant with the requirements of the destination jurisdiction.

The method concludes at step 880, having completed compliance validation, settlement computation (if applicable), and synchronized recording of results across multiple ledgers and jurisdictions.

Definition

Digital Artifact

A machine-generated output produced by an artificial intelligence model or other computational system, including but not limited to text, numerical predictions, reports, images, structured data, alerts, or any other computable representation.

Deterministic Digest

A reproducible hash, fingerprint, or cryptographic summary of a digital artifact generated using a deterministic algorithm such that identical artifacts yield identical digests.

Artifact Registry

A data structure, storage system, or database configured to store deterministic digests and associated metadata for digital artifacts.

Compliance Token

A machine-interpretable data object that encodes policy predicates, consent scope, jurisdictional lineage, monetization parameters, cryptographic components, and other metadata used to govern handling of a corresponding digital artifact.

Policy Predicate Set

A structured collection of rules, constraints, or conditions relevant to compliance, regulatory, operational, or contractual evaluation of a digital artifact.

Consent Scope

Information indicating the permissions, authorizations, or permitted uses associated with data that contributed to generating a digital artifact.

Jurisdictional Lineage

Information describing the regulatory, geographic, legal, or institutional origins of data, models, or computation processes relevant to a digital artifact.

Monetization Parameters

Values encoded in a compliance token specifying baseline royalties, weighting coefficients, allocation parameters, or other rules for computing settlement or reimbursement outcomes.

Zero-Knowledge Proof (ZKP) Component

A set of data enabling validation of a predicate without revealing underlying confidential information. The component may include a statement identifier, cryptographic commitment, verification key, and associated proof material.

zk-SNARK/zk-STARK

Examples of zero-knowledge proof constructions. zk-SNARKs typically use succinct, non-interactive arguments with trusted or partially trusted setup, while zk-STARKs provide transparent, hash-based proofs without trusted setup.

Gateway Verifier

A computing module or system that evaluates a compliance token and digital artifact, typically using signature verification, zero-knowledge proof validation, and policy evaluation, and produces a permit-or-deny decision.

Finite-State Machine (FSM)

A computational model that performs operations according to a defined sequence of discrete states and state transitions, used here to structure compliance verification steps.

Permit-or-Deny Decision

A binary or otherwise enumerated determination produced by the gateway verifier indicating whether a digital artifact is authorized for use, transmission, or storage based on policy and cryptographic evaluation.

Commit Entry

A data record containing verification outputs, compliance decisions, settlement results, or related metadata, produced during or after the gateway verifier's evaluation process.

Dual-Ledger Commit Engine

A component that writes commit entries to both a compliance ledger and a financial ledger using atomic or coordinated transaction techniques to maintain synchronization.

Compliance Ledger

A storage system or ledger that records compliance-related results, verification outcomes, or policy-evaluation records.

Financial Ledger

A storage system or ledger that records royalty computations, settlement results, or monetary allocations associated with digital artifact usage.

Atomic Transaction/Atomic Commit

A transaction mechanism in which multiple write operations to distinct systems or data stores complete as a single indivisible unit, such that all succeed or none succeed.

Settlement Engine

A computational module that computes monetary or operational settlement values, which may depend on validated outcome metrics and monetization parameters.

Outcome Metric

A measurable performance value—such as accuracy, error reduction, emissions reduction, or fraud-reduction effectiveness—used to adjust settlement or royalty calculations.

Jurisdictional Transition Engine

A system component that detects geographic, regulatory, or institutional boundary crossings of digital artifacts and generates updated or forked compliance tokens with region-specific predicate sets.

Token Fork/Forked Compliance Token

A modified or descendant compliance token created when a digital artifact crosses a jurisdictional boundary, incorporating updated policy or regulatory requirements while maintaining lineage to the original token.

Lineage or Ancestry Reference

A data element indicating a parent or predecessor token associated with a forked compliance token.

Transmission Request

Any request, message, routing operation, or data-transfer event that seeks to propagate a digital artifact to another system, user, region, or jurisdiction.

Proof Verification

A computational process that confirms the validity of a zero-knowledge proof relative to encoded predicates, commitments, and verification keys.

Constraint Satisfaction

The process of verifying that a set of conditions or logical constraints encoded in a zero-knowledge proof or policy predicate is satisfied.

Ledger Interface

A communication or software layer enabling the commit engine or settlement engine to perform write operations to compliance or financial ledgers.

Commit Receipt

A confirmation artifact indicating successful synchronized recording of commit entries across ledgers.

Region Identification Interface

A component that determines which jurisdiction, regulatory area, or geographic region a transmission request or artifact destination corresponds to.

Predicate Extraction

Retrieval or construction of the specific policy or jurisdictional rules applicable to a given artifact or region.

Model Execution Context

Information describing the environment, configuration, or metadata associated with generating a digital artifact from an artificial intelligence model.

Cryptographic Commitment

A cryptographic structure that binds a prover to a value without revealing it, used in zero-knowledge proofs.

Verification Key

A public parameter used by a verifier to check the correctness of a zero-knowledge proof.

Verification Record

A machine-generated data structure containing the combined results of zero-knowledge proof validation and policy evaluation associated with a digital artifact. The verification record represents the authoritative compliance determination used by subsequent components such as the settlement engine and the dual-ledger commit engine.

Settlement Receipt

A data record associated with an adjusted royalty or settlement computation, including monetary values, allocation parameters, and references to the corresponding verification record or commit entry.

Updated Jurisdictional Predicates

A modified subset of policy or regulatory constraints incorporated into a forked or updated compliance token to reflect the requirements of a newly detected jurisdiction or regulatory region.

Parent Token Identifier

A data element included within a forked or updated compliance token that references the originating token from which the new token derives, thereby preserving compliance lineage across jurisdictional transitions.

DETAILED DESCRIPTION OF THE INVENTION

The following detailed description provides illustrative embodiments of systems, methods, and computer-readable media for enforcing compliance, policy governance, zero-knowledge proof validation, jurisdictional propagation, settlement computation, and dual-ledger commit operations for digital artifacts generated by artificial intelligence models. These embodiments are provided as examples and are not intended to limit the scope of the invention.

In the embodiments described herein, a digital artifact may be any form of machine-generated content, including text, numerical predictions, clinical recommendations, structured data, images, reports, or any other computable output produced by one or more artificial intelligence models. As shown in FIG. 1, an artificial intelligence model 110 produces a digital artifact 112, which is forwarded to an artifact registry 120. The artifact registry computes and stores a deterministic digest of the artifact, enabling consistent identification and cross-referencing throughout compliance verification and audit operations.

A compliance token generator 130 constructs a compliance token 132 associated with the artifact. As illustrated in FIG. 2, the compliance token includes a token header 200, general metadata 212, a policy predicate set 202, a consent scope 204, jurisdictional lineage information 206, monetization parameters 208, and a token signature field 210. A token hash 230 may additionally be included to ensure unique referencing of the token across distributed systems. The compliance token further includes a zero-knowledge proof component 150, which contains a statement identifier 220, a cryptographic commitment 222, and a verification key 224. These components allow the system to confirm compliance with policy, consent, or jurisdictional predicates without exposing regulated or sensitive data.

The compliance token and associated artifact are provided to a gateway verifier 140. As shown in FIG. 3, the gateway verifier is implemented as a finite-state machine (FSM) managed by an FSM controller core 300. The FSM begins in a token-intake state 302, where the compliance token 132 and artifact are received through a token input stream 340 and artifact input stream 342. Once parsed, the FSM transitions to a signature-verification state 304, where the token signature is validated using trusted issuer credentials. If the signature verification fails, the FSM transitions to an error-handling state 312. Otherwise, it proceeds to a zero-knowledge proof verification state 306.

The zero-knowledge proof verification process is depicted in FIG. 4. A prover system 410 generates a zero-knowledge proof 414 based on the ZKP component 150 of the compliance token. The ZKP verifier 144 receives the proof through a parser 420, preprocesses the proof in stage 422, and applies a verification algorithm 424 that may include pairing-based or hash-based operations depending on whether zk-SNARK or zk-STARK constructions are used. A constraint-satisfaction checker 426 confirms whether the underlying predicate has been satisfied. A valid proof indicator 434 or failure flag 432 is produced and communicated to the FSM, enabling the FSM to proceed to policy evaluation or transition to error handling as appropriate.

Upon completion of ZKP verification, the FSM transitions to a policy-evaluation state 308, where the policy predicate set 202 is interpreted. The result of this evaluation determines whether the artifact is permitted for use or transmission. The FSM then transitions to a commit state 310, where a commit entry is generated and output through a commit-entry channel 352. The commit entry includes the artifact identifier, the result of ZKP validation, the policy-evaluation result, and the permit-or-deny decision.

In embodiments involving financial or operational settlement conditions, the settlement engine 160 computes an adjusted royalty value. FIG. 5 illustrates this process: a settlement controller 500 retrieves monetization parameters through an input interface 502, extracts the baseline royalty $R_0$ via extractor 504, retrieves a weighting coefficient $\alpha$ via extractor 506, and obtains a validated outcome metric m_raw through interface 508. A metric validation module m 510 confirms the correctness of the metric, and in some embodiments a zero-knowledge certification interface 512 couples the settlement computation to validated proof results. A royalty computation module 520 computes an adjusted royalty value 522 using $R=R_0(1+\alpha m)$. A settlement receipt generator 530 produces a settlement record 540, which is forwarded to the dual-ledger commit engine 170.

The dual-ledger commit engine is shown in FIG. 6. A commit engine controller 600 receives the commit entry through interface 602. An atomic commit coordinator 604 constructs a transaction bundle via constructor 606. A consistency validator 608 ensures that the compliance and settlement components align with jurisdictional and regulatory constraints. A lock or two-phase commit manager 610 coordinates writes to both the compliance ledger 180 and the financial ledger 182 via interfaces 620 and 630. Operations 622 and 632 are executed atomically. A unified commit receipt 640 and synchronization status 642 confirm successful completion. In the event of a divergence, a rollback manager 612 reverses any partial operations and generates an error indicator 650.

Jurisdictional transitions may require the compliance token to be transformed. FIG. 7 illustrates an example jurisdictional transition engine 700 capable of detecting a boundary crossing between a source jurisdiction 702 and a destination jurisdiction 704. A transmission request analyzer 716, working with a boundary detection module 710 and region identification interface 712, determines whether a cross-jurisdiction event has occurred. A policy-jurisdiction mapping store 714 and predicate extractor 718 retrieve the applicable constraints for the destination jurisdiction.

Upon detecting a jurisdictional transition, a token fork generator 720 creates a forked compliance token 722 with updated jurisdictional predicates 724, an updated consent or scope record 726, and a region-specific policy predicate set 728. A lineage updater 730 maintains ancestry information by setting a parent token reference 732. The forked token may be dispatched through region-specific dispatcher 740, logged via event log 746, and integrated with ledger updates via interface 744.

An overview of the method performed by the system is shown in FIG. 8. The method begins at step 800, where a digital artifact is produced. A deterministic digest is computed at step 804 and stored at step 806. A compliance token is constructed at step 810, including encoding of policy predicates (812), consent scope (814), jurisdictional lineage (816), monetization parameters (818), and a zero-knowledge proof component (820). The gateway verifier receives the token and artifact in step 830, performs signature verification in step 832, executes zero-knowledge proof verification in step 834, evaluates policy predicates in step 836, and produces a permit-or-deny decision in step 838. A commit entry is constructed at step 840, and ZKP validation, policy-evaluation results, and the final decision are recorded in steps 842, 844, and 846.

If applicable, monetization parameters are retrieved at step 850, outcome metrics validated at step 852, and the adjusted royalty computed at step 854 and appended to the commit entry at step 856. In step 860, an atomic transaction bundle is prepared, written to both ledgers in steps 862 and 864, and confirmed in step 866. Jurisdictional transitions are handled by detecting boundary crossings at step 870, generating forked tokens at step 872, and applying updated predicates during subsequent evaluation and settlement at step 874. The method concludes at step 880.

These embodiments illustrate systems and processes for cryptographically verifiable, policy-aware, jurisdictionally adaptive, and financially integrated compliance enforcement for digital artifacts produced by artificial intelligence systems. Variations and modifications will be apparent to those skilled in the art, and the scope of the invention is defined by the appended claims.

Exemplary Use Cases and Operational Scenarios

The following exemplary use cases and operational scenarios illustrate the operation of the systems and methods described in this disclosure. These examples are provided for explanatory purposes only and do not limit the scope of the invention.

AI-Generated Clinical Decision Support Output in a Multi-Region Hospital Network In one scenario, an artificial intelligence model generates a clinical decision support recommendation for use in a hospital environment. A deterministic digest of the recommendation is generated and stored in the artifact registry. The compliance token constructed for the recommendation encodes the relevant institutional consent rules, local privacy requirements, Software-as-a-Medical-Device predicate constraints, and the jurisdictional lineage of the patient record involved in generating the output.

Before the recommendation is displayed to a clinician or transferred to another system, it is processed by the gateway verifier. The system validates the compliance token's signature, confirms via zero-knowledge proof verification that the model was evaluated under permitted conditions, and evaluates regulatory predicates such as restrictions on cross-departmental access.

If the output is to be transmitted from one hospital within a regional network to another located in a different regulatory jurisdiction, the system detects this boundary transition. A forked compliance token is generated with updated jurisdictional predicates, permitting the output to remain in regulatory alignment with the receiving region. The final compliance decision and any associated settlement considerations (such as SaMD usage reimbursements) are written atomically to compliance and financial ledgers.

Fraud-Detection Output in a Cross-Border Financial Transaction

In another scenario, a fraud-detection model produces a fraud-risk score for a financial transaction. A compliance token is created that encodes AML and KYC-related rules, applicable cross-border data-handling restrictions, jurisdictional lineage, and monetization parameters associated with model usage.

Because financial regulations differ between jurisdictions, the gateway verifier ensures that the fraud-risk score is only transmitted to permitted entities. A zero-knowledge proof validates that the AML-specific policy predicates encoded in the compliance token were satisfied during model execution, including verifying that personally identifiable information was never exposed during evaluation.

If the transaction is routed to a financial institution in a different region, the jurisdictional transition engine detects the cross-border transfer and produces a forked token containing the updated regulatory controls for the destination region. Both the compliance decision and any cost-sharing or royalty settlement stemming from validated fraud-reduction performance metrics are committed atomically to the appropriate ledgers.

Carbon-Reduction Optimization Output with Verified Emissions Metrics

In a sustainability monitoring context, an AI model predicts optimal operational settings that reduce carbon emissions for an industrial facility. The compliance token includes consent restrictions, environmental-reporting policies, jurisdiction-specific emissions disclosure requirements, and monetization parameters tied to validated emissions reductions.

The gateway verifier ensures that a zero-knowledge proof confirms the emissions-reduction metric was computed from approved sensor sources, without revealing commercially sensitive operational data. The settlement engine computes an adjusted payment value based on the magnitude of verified carbon-reduction impact.

If the emissions data or optimization recommendations are transmitted to a region with different environmental reporting laws, the system produces a forked compliance token with updated jurisdictional lineage information. This allows downstream reporting systems to apply the correct standards automatically.

Inter-Institutional Academic or Research Data Sharing

A research institution may use an AI model to generate a dataset transformation or anonymized output derived from protected research data. The compliance token includes a consent scope specifying the permitted academic uses, access limitations, and any embargo-period restrictions.

Before the transformed dataset is transmitted to another institution, the gateway verifier ensures that all institutional review board (IRB) and consent requirements were respected. Zero-knowledge proof verification allows the system to demonstrate that the transformation process satisfied de-identification predicates without revealing any original sensitive data.

If the receiving institution is located in a different country, the jurisdictional transition engine updates the token's regulatory lineage and applies the requirements of the destination region's research-data governance rules. Ledger entries preserve an audit trail of all compliance evaluations associated with the dataset exchange.

Distributed Model-Marketplace or AI-as-a-Service Royalty Allocation

In a distributed AI marketplace, a digital artifact generated by a contributed model includes monetization parameters that specify baseline royalties and outcome-based weighting coefficients. The gateway verifier validates that the compliance token associated with the artifact satisfies the marketplace's operational and regulatory rules.

Zero-knowledge verification ensures that the performance metric used for royalty calculation—such as model accuracy improvement or reduced false positives—was computed correctly without revealing raw evaluation datasets. The settlement engine computes the adjusted royalty according to the parameters encoded in the compliance token and records the resulting value as part of a commit entry.

When the artifact is transmitted to a region with different licensing requirements or commercial restrictions, a forked token with updated jurisdictional parameters ensures that downstream usage and settlement remains compliant. The dual-ledger atomic commit mechanism synchronizes the compliance and financial records of all participating parties in a deterministic manner.

Multi-Cloud or Hybrid-Cloud Regulatory Boundary Enforcement

In a cloud-deployment scenario, an enterprise may run different components of an AI system in distinct regulatory regions. The system detects when a digital artifact or model output is routed from an environment subject to one jurisdiction to a cloud region subject to another.

A forked token with updated jurisdictional predicates is generated automatically. The gateway verifier validates any applicable cloud-specific policies—such as restrictions on transferring certain health data to non-domestic cloud infrastructure—and records the verification results in the compliance ledger. If cost allocation or pay-per-use billing applies, the settlement engine computes a region-appropriate royalty or charge.

This scenario provides deterministic, auditable enforcement of geographically distinct regulatory constraints in multi-cloud environments.

Advantages of the Invention

The systems and methods described in this disclosure provide several technological advantages over existing approaches to compliance verification, governance, and settlement operations for digital artifacts generated by artificial intelligence models.

The invention introduces a computational architecture that enables compliance decisions to be carried out deterministically and without exposure of underlying regulated or sensitive data. Unlike conventional compliance systems, which typically rely on centralized checks, manual auditing, or retrospective analysis, the invention provides a machine-executable pathway that validates policy predicates using zero-knowledge proofs. This not only preserves confidentiality but also allows compliance verification to occur at machine speed, enabling real-time enforcement in environments where AI systems operate continuously and autonomously.

The invention further improves the reliability and trustworthiness of distributed compliance infrastructures by incorporating a deterministic finite-state machine as the gateway verifier. By structuring compliance verification as an explicitly ordered sequence of signature verification, zero-knowledge proof evaluation, policy evaluation, and commit operations, the system reduces ambiguity, eliminates reliance on ad hoc procedural logic, and ensures that verification is performed consistently across all deployments.

Another advantage lies in the treatment of jurisdictional and regulatory boundaries. Existing systems typically handle cross-border data transitions manually or require separate, region-specific implementations. The invention introduces a mechanism for detecting jurisdictional transitions and generating a forked compliance token with updated regulatory parameters. This allows compliance policies to propagate automatically across regions, ensuring that digital artifacts remain aligned with the laws and requirements of the destination jurisdiction without requiring wholesale duplication of compliance logic.

The dual-ledger atomic commit mechanism described in this disclosure provides additional benefits by ensuring that compliance verification and financial or operational settlement results remain synchronized across distributed systems. Traditional architectures often record compliance results and economic transactions separately, which can lead to inconsistencies, incomplete records, or disputes regarding authorization or settlement. By writing compliance and financial entries as part of a single atomic transaction, the invention prevents divergence and enhances the auditability of both regulatory and economic outcomes.

The settlement engine provides another layer of technical advantage by binding outcome-weighted settlement computations to validated zero-knowledge proof results. This makes it possible to compute royalties, reimbursements, or other settlement values based on performance metrics that are cryptographically certified. The system therefore supports revenue-sharing or performance-based compensation models in regulated environments without compromising data privacy or confidentiality.

Across all embodiments, the invention creates a unified governance framework in which compliance, privacy, consent, jurisdictional lineage, monetization parameters, and verification artifacts are encoded within a single machine-interpretable token. This integration reduces complexity, improves auditability, and provides a clear and verifiable chain of custody for digital artifacts as they flow across models, systems, and geographic regions.

In combination, these advantages enable a level of automated regulatory enforcement, privacy-preserving validation, and multi-region governance that is not available in conventional architectures. The invention therefore provides significant improvements to the technological fields of distributed computing, regulated data processing, cryptographic verification, and artificial intelligence governance.

Alternative Embodiments

The invention may be embodied in numerous forms and configurations beyond those expressly illustrated in the preceding figures. The following alternative embodiments are provided to demonstrate additional ways in which the described systems, methods, and computer-readable media may be implemented, without limiting the scope of the invention.

In some embodiments, the gateway verifier may employ verification logic that differs from the finite-state implementation described in FIG. 3. For example, the verifier may be implemented as an event-driven process, a microservices pipeline, a distributed state machine replicated across multiple compute nodes, or a consensus-based validator operating within a permissioned ledger network. These implementations may apply the same ordered verification steps—signature verification, zero-knowledge proof validation, policy evaluation, and commit—but may distribute the execution across multiple components for scalability or fault tolerance.

In other embodiments, the compliance token may include additional fields tailored to specific regulatory regimes or operational constraints. For instance, the token may incorporate provenance descriptors, device identifiers, model-version trace data, or environmental-context metadata that records the execution environment in which the artifact was generated. The token may also include short-lived cryptographic components or time-restricted predicates for scenarios in which regulatory permissions are valid only within specific temporal intervals.

The zero-knowledge proof component may employ techniques beyond zk-SNARKs and zk-STARKs. In some embodiments, the system may utilize Bulletproofs, Sigma protocols, MPC-in-the-head constructions, or hybrid proof systems that combine STARK-style transparency with SNARK-style succinctness. The verifier may additionally support proof aggregation, recursive proofs, or streaming verification for long-running computations or large model inference traces. The cryptographic commitment may be implemented using polynomial commitments, vector commitments, Merkle-based trees, or lattice-based constructions compatible with post-quantum requirements.

The jurisdictional transition engine may operate using a variety of triggers. In certain embodiments, the system may detect jurisdictional transitions not only through explicit routing metadata, but also through changes in requester identity, resource location, autonomous agent behavior, cloud-region rebalancing events, or edge-compute deployment constraints. The token-forking process may generate more than one descendant token simultaneously when a digital artifact is propagated to multiple jurisdictions or regulatory environments in parallel. These forked tokens may diverge in their policy predicates, consent scopes, monetization rules, or lineage-tracking requirements, while still maintaining cryptographically verifiable ancestry links to the originating token.

In some embodiments, settlement computations may be performed using formulas or functions other than the linear weighting scheme described. The settlement engine may support non-linear mappings, tiered reimbursement models, quota-based royalty escalation, amortized performance adjustments, or dynamic utility-based cost allocations. The outcome metrics may be obtained from authenticated sensor networks, federated evaluation systems, privacy-preserving analytics platforms, or multi-institution consortia performing joint model validation. The system may accept outcome metrics validated through statistical attestation, secure multiparty computation, or homomorphic encryption in addition to zero-knowledge proofs.

The dual-ledger commit engine may interact with a wide variety of ledger systems. In certain embodiments, the compliance ledger may be implemented as a relational or document-oriented database, while the financial ledger may be implemented as a permissioned blockchain. In other embodiments, both ledgers may be blockchain-based, or both may be conventional transactional databases. The atomic commit may be executed using two-phase commit, three-phase commit, Paxos-style consensus, Byzantine-fault-tolerant consensus, optimistic concurrency, or hardware-assisted transactional memory mechanisms. The commit engine may additionally include conflict-resolution procedures for reconciling ledger discrepancies, delayed writes, or multi-party signature requirements.

In still other embodiments, the invention may be applied to scenarios in which digital artifacts are generated not by centralized AI models but by federated learning systems, edge-deployed inference nodes, or distributed generative models operating within a consortium of institutions. The compliance token may encode model-version identifiers, participant IDs, training-data jurisdictions, or institutional contribution weights. The system may enforce policy constraints during both inference and retraining operations, including validating that retraining data complies with consent scope and lineage requirements without revealing underlying personal or proprietary information.

Although certain embodiments describe digital artifacts generated by artificial intelligence systems, the invention may also be applied to digital artifacts created by non-AI systems, provided that the same compliance, jurisdictional, and settlement mechanisms are relevant. In such cases, the compliance token may represent constraints on data access, transformation rules, processing entitlements, or contractual obligations rather than AI-specific policies.

These and other variations will be apparent to those skilled in the art in view of the disclosure provided herein. The examples described are intended to illustrate the flexibility and extensibility of the invention and do not limit the claims except as expressly recited therein.

Technical Advantages

The invention provides several technical advantages that improve the operation, reliability, determinism, and trustworthiness of computer systems responsible for validating, transmitting, and governing digital artifacts produced by artificial intelligence models.

One technical advantage arises from the use of cryptographic zero-knowledge proof mechanisms to validate policy predicates, consent rules, and jurisdictional constraints without exposing any underlying regulated data. By employing succinct or transparent proof systems such as zk-SNARKs or zk-STARKs, the system performs verification as a purely computational process that avoids the need for data disclosure or inspection. This significantly reduces the computational overhead associated with traditional access-control or compliance-review methods and allows verification to occur in environments where sensitive data cannot be revealed. The result is a more secure, privacy-preserving technical pathway for compliance evaluation in distributed or untrusted settings.

Another technical advantage is the deterministic sequencing of compliance verification operations using a finite-state machine architecture. By encoding the verification logic as an ordered set of machine states—token intake, signature validation, zero-knowledge proof verification, policy evaluation, and commit—the system eliminates ambiguity and nondeterminism that may arise in procedural or ad hoc implementations. This improves reliability and enables reproducible compliance outcomes across geographically distributed systems, heterogeneous computing environments, and multi-institution workflows.

The invention also introduces technical improvements related to the movement of digital artifacts across jurisdictional or regulatory boundaries. The jurisdictional transition engine detects region transitions using machine-identifiable signals and automatically generates a forked compliance token containing updated policy and jurisdictional predicates. This allows downstream systems to process artifacts correctly under different legal or regulatory regimes without requiring manual configuration or duplicated infrastructure. Technically, the invention provides a mechanism to propagate region-specific computation rules through a cryptographically verifiable token, enabling dynamic adaptation to different compliance domains.

The dual-ledger atomic commit mechanism provides an additional technical advantage by ensuring that compliance and financial records remain synchronized across multiple distributed systems. Traditional systems often store compliance decisions and financial transactions in separate data stores, which can lead to data races, partial updates, and other inconsistency problems. The invention's atomic commit engine coordinates simultaneous updates to a compliance ledger and a financial ledger, employing transaction-bundling, lock coordination, or commit-protocol techniques to prevent divergence. This results in a more robust distributed architecture that maintains internal consistency even in the presence of network latency, partial failures, or concurrent write attempts.

Moreover, the settlement engine improves the technical field of distributed computation by binding financial or operational settlement calculations to cryptographically validated outcome metrics. The system computes adjusted settlement values based on validated predicates and mathematically encoded parameters stored within the compliance token. Because the computation is linked to validated metrics and integrated into the same deterministic commit sequence as the compliance decision, the system eliminates the need for external reconciliation processes and reduces the risk of computational divergence between compliance engines and settlement systems.

Finally, the unified token structure—which encodes policy predicates, consent rules, jurisdictional lineage, monetization parameters, and zero-knowledge proof components into a single machine-interpretable object—provides a technical advantage by reducing the number of moving parts required to track the provenance, compliance status, and financial implications of a digital artifact. This integration simplifies communication between distributed systems, reduces serialization and deserialization overhead, and allows downstream verification modules to operate directly on a fully self-describing token.

Collectively, these technical advantages improve the performance, determinism, interoperability, and privacy characteristics of systems responsible for managing digital artifacts in regulated environments. The described architecture enhances the computational integrity of compliance verification, simplifies cross-jurisdictional governance, and provides a unified, machine-enforceable framework for synchronizing compliance and settlement decisions across distributed computing infrastructures.

The invention claimed is:

1. A computer-implemented compliance governance system including a hardware processor comprising: a) an artifact registry configured to store deterministic digests of digital artifacts generated by one or more artificial intelligence models; b) a compliance token associated with a digital artifact, the compliance token encoding:
   i. a policy predicate set,
   ii. a consent scope,
   iii. a jurisdictional lineage,
   iv. monetization parameters, and
   v. a zero-knowledge proof (ZKP) component comprising a proof statement identifier, a cryptographic commitment, and a verification key;
   c) a gateway verifier implemented as a finite-state machine comprising at least a token-intake state, a signature-verification state, a zero-knowledge proof verification state, a policy-evaluation state, and a commit state;
   d) wherein, during the zero-knowledge proof verification state, the gateway verifier executes a zero-knowledge proof verification procedure to validate one or more policy predicates without accessing underlying regulated data; and
   e) a ledger interface configured to generate and record a commit entry comprising an artifact identifier, a ZKP validation outcome, a policy-evaluation outcome, and a permit-or-deny decision.

2. The system of claim 1, further comprising a settlement engine configured to compute an adjusted royalty value $$R = R_0(1 + \alpha m),$$

where $R_0$ and $\alpha$ are encoded in the compliance token and m is a validated outcome metric,
and to record a settlement receipt associated with the computed royalty value in the commit entry.

3. The system of claim 1, further comprising a settlement engine and a dual-ledger commit engine, wherein the compliance decision and the zero-knowledge proof validation result together form an indivisible verification record included in the commit entry, the verification record being used by both the settlement engine and the dual-ledger commit engine.

4. The system of claim 1, further comprising a dual-ledger commit engine configured to write the commit entry as a single atomic transaction to both:
   a) a compliance ledger, and
   b) a financial ledger,
   and wherein the compliance token includes jurisdictional predicate sets that modify policy evaluation or settlement allocation when a requested transmission crosses a jurisdictional boundary.

5. The system of claim 1, wherein the compliance token further provides monetization parameters used by a settlement engine configured to:
   a) extract a baseline royalty value and at least one weighting coefficient;
   b) receive and validate an outcome metric using attestation data or zero-knowledge proof artifacts;
   c) compute an adjusted royalty value based on the monetization parameters and the validated outcome metric; and
   d) generate a settlement record for inclusion in the commit entry.

6. The system of claim 1, wherein the gateway verifier comprises a finite-state machine configured to execute a deterministic sequence of states, the sequence consisting of:
   a) a token-intake state configured to receive and parse the compliance token;
   b) a signature-verification state configured to authenticate the compliance token;
   c) a zero-knowledge proof verification state configured to verify one or more policy predicates without accessing underlying regulated data;
   d) a policy-evaluation state configured to evaluate the policy predicate set; and
   e) a commit state configured to generate the permit-or-deny decision;
   and wherein the finite-state machine further comprises an error state configured to emit a terminal reject output responsive to a failed signature verification or failed zero-knowledge proof verification, and a policy-decision output channel configured to emit the permit-or-deny decision upon completion of the policy-evaluation state.

7. The system of claim 1, further comprising a jurisdictional transition engine configured to:
   a) detect that a transmission of the digital artifact crosses from a source jurisdiction to a destination jurisdiction;
   b) retrieve jurisdiction-specific predicates associated with the destination jurisdiction;
   c) generate a forked compliance token incorporating updated jurisdictional predicates and updated consent or policy predicate information; and
   d) record lineage information linking the forked compliance token to the original token.

8. The system of claim 1, wherein the gateway verifier finite-state machine further comprises an error state configured to emit a terminal reject output in response to a failed signature verification or failed zero-knowledge proof verification, and a policy-decision output channel configured to emit the permit-or-deny decision produced in the commit state.

9. The system of claim 1, wherein the zero-knowledge proof component comprises a proof generated using a succinct non-interactive argument or a transparent proof system, including but not limited to zk-SNARK or zk-STARK constructions.

10. The system of claim 1, wherein the zero-knowledge proof validates consent predicates without revealing any patient identifiers.

11. The system of claim 1, wherein the zero-knowledge proof validates dataset-lineage predicates defined in a predetermined change control plan for Software as a Medical Device.

12. The system of claim 1, wherein the zero-knowledge proof validates export-control predicates or cross-border transmission restrictions associated with the jurisdictional lineage.

13. The system of claim 4, wherein crossing a jurisdictional boundary triggers generation of a token fork comprising updated jurisdictional predicates.

14. A computer-implemented method for enforcing compliance of digital artifacts generated by an artificial intelligence model, the method comprising:

a) generating a deterministic digest of a digital artifact and storing the digest in an artifact registry;

b) generating a compliance token associated with the digital artifact, the compliance token encoding:

i. a policy predicate set, ii. a consent scope, iii. a jurisdictional lineage, iv. monetization parameters, and v. a zero-knowledge proof component comprising a proof statement identifier, a cryptographic commitment, and a verification key;

c) receiving, at a gateway verifier implemented as a finite-state machine, the compliance token and the digital artifact;

d) verifying a digital signature of the compliance token;

e) executing a zero-knowledge proof verification procedure to validate one or more policy predicates without accessing underlying regulated data;

f) evaluating the policy predicate set to generate a permit-or-deny decision; and g) recording a commit entry to a ledger, the commit entry comprising an artifact identifier, a zero-knowledge proof validation outcome, and a permit-or-deny decision.

15. The method of claim 14, further comprising:

h) computing, by a settlement engine, an adjusted royalty value $$R=R_0(1+\alpha m),$$

where $R_0$ and $\alpha$ are encoded in the compliance token, and m is a validated outcome metric; and i) recording the computed royalty value as part of the commit entry.

16. The method of claim 14, further comprising:

h) writing the commit entry as a single atomic transaction to both a compliance ledger and a financial ledger; and i) applying jurisdictional predicate sets encoded in the compliance token that modify policy or settlement evaluation when the transmission crosses a jurisdictional boundary.

17. A non-transitory computer-readable medium storing instructions that, when executed by one or more processors, cause the processors to perform operations comprising:

a) storing a deterministic digest of a digital artifact in an artifact registry;

b) generating a compliance token encoding:

i. a policy predicate set, ii. a consent scope, iii. a jurisdictional lineage, iv. monetization parameters, and v. a zero-knowledge proof component comprising a proof statement identifier, a cryptographic commitment, and a verification key;

c) verifying, by a gateway verifier implemented as a finite-state machine, a digital signature of the compliance token;

d) executing a zero-knowledge proof verification procedure to validate one or more policy predicates without accessing underlying regulated data;

e) evaluating the policy predicate set; and f) recording a commit entry to a ledger, the commit entry comprising an artifact identifier, a zero-knowledge proof validation outcome, and a permit-or-deny decision.

18. The medium of claim 17, wherein the instructions further cause the processors to:

g) compute an adjusted royalty value $$R=R_0(1+\alpha m),$$

where $R_0$ and $\alpha$ are encoded in the compliance token, and m is a validated outcome metric; and h) record the computed royalty value in association with the commit entry.

19. The medium of claim 17, wherein the instructions further cause the processors to:

g) write the commit entry as a single atomic transaction to both a compliance ledger and a financial ledger; and h) apply jurisdictional predicate sets encoded in the compliance token that modify policy or settlement evaluation when a transmission crosses a jurisdictional boundary.

20. The medium of claim 17, wherein the instructions further cause the processors to, upon detecting that a requested transmission of the digital artifact crosses a jurisdictional boundary, generate a token fork comprising updated jurisdictional predicates and apply the updated predicates during policy evaluation or settlement computation.

\* \* \* \* \*